(12) United States Patent
Tsukamoto

(10) Patent No.: US 9,929,600 B2
(45) Date of Patent: Mar. 27, 2018

(54) WIRELESS POWER SUPPLY SYSTEM AND WIRELESS POWER RECEPTION DEVICE

(71) Applicant: NISSAN MOTOR CO., LTD., Yokohama-shi, Kanagawa (JP)

(72) Inventor: Yukinori Tsukamoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/301,818

(22) PCT Filed: Apr. 8, 2014

(86) PCT No.: PCT/JP2014/060199
§ 371 (c)(1),
(2) Date: Oct. 4, 2016

(87) PCT Pub. No.: WO2015/155837
PCT Pub. Date: Oct. 15, 2015

(65) Prior Publication Data
US 2017/0126060 A1 May 4, 2017

(51) Int. Cl.
*H02J 50/10* (2016.01)
*H02J 50/40* (2016.01)
(Continued)

(52) U.S. Cl.
CPC ............... *H02J 50/10* (2016.02); *B60L 11/18* (2013.01); *B60L 11/182* (2013.01); *H02J 7/025* (2013.01);
(Continued)

(58) Field of Classification Search
CPC .. H02J 50/10; H02J 50/40; H02J 5/005; H02J 7/025; H02J 17/00; B60L 11/182;
(Continued)

(56) References Cited

U.S. PATENT DOCUMENTS 9,728,325 B2 * 8/2017 Chiyo ................... H01F 27/346
2013/0009462 A1   1/2013 Amano et al.
(Continued)

FOREIGN PATENT DOCUMENTS

CN       103119829 A     5/2013
CN       103477533 A    12/2013
(Continued)

*Primary Examiner* — Rexford Barnie
*Assistant Examiner* — Thai Tran
(74) *Attorney, Agent, or Firm* — Foley & Lardner LLP

(57) ABSTRACT

When a vehicle approaches a parking space, a ground controller excites a power transmission coil using an excitation pattern signal containing identification data, and a vehicle controller acquires the identification data from the excitation pattern signal received by at least one of subcoils. Then, a communication unit transmits the acquired identification data to the ground unit. The ground controller pairs the power transmission coil and the power reception coil with each other when the identification data contained in the excitation pattern signal and the identification data transmitted from the vehicle controller match each other. Also, the pairing is canceled if the identification data received by the subcoil provided on the front side and the identification data received by the subcoil provided on the rear side are different from each other.

5 Claims, 23 Drawing Sheets

(51) Int. Cl.
- *H02J 50/90* (2016.01)
- *H02J 50/80* (2016.01)
- *B60L 11/18* (2006.01)
- *H02J 7/02* (2016.01)

(52) U.S. Cl.
CPC .............. *H02J 50/40* (2016.02); *H02J 50/80* (2016.02); *H02J 50/90* (2016.02)

(58) Field of Classification Search
CPC .. B60L 5/005; B60L 11/1829–11/1831; H04B 5/0025–5/0093; H02N 2/008; Y02T 90/122; H01F 27/006; H01F 38/14; H01F 2038/143–2038/146; H01R 13/6633; A61B 1/00029; A61N 1/3787
USPC .......................................... 307/104; 320/108
See application file for complete search history.

(56) References Cited

U.S. PATENT DOCUMENTS

| | | |
|---|---|---|
| 2013/0038272 A1 | 2/2013 | Sagata |
| 2013/0181669 A1 | 7/2013 | Kawasaki |
| 2014/0015341 A1 | 1/2014 | Kagami et al. |
| 2015/0239354 A1 | 8/2015 | Gorai et al. |

FOREIGN PATENT DOCUMENTS

| | | |
|---|---|---|
| JP | 2013-240130 A | 11/2013 |
| WO | WO 2012/042902 A1 | 4/2012 |
| WO | WO 2012/086048 A1 | 6/2012 |
| WO | WO 2012/111127 A1 | 8/2012 |
| WO | WO 2014/041655 A1 | 3/2014 |

\* cited by examiner

EXAMPLE OF TRANSMITTED DATA

| START BIT | ID | DATA-LENGTH CODE | IDENTIFICATION DATA | SUM VALUE | STOP BIT |
|---|---|---|---|---|---|

FIG. 8
(a) RECEIVED VOLTAGE
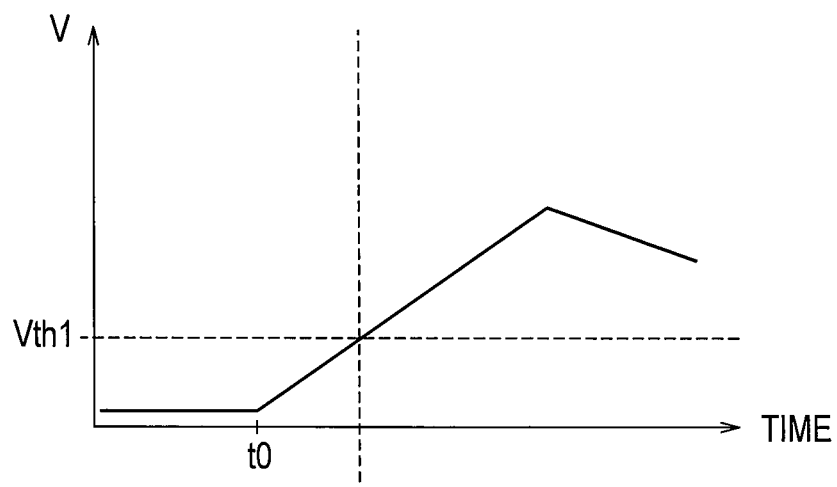
(b) IDENTIFICATION DATA
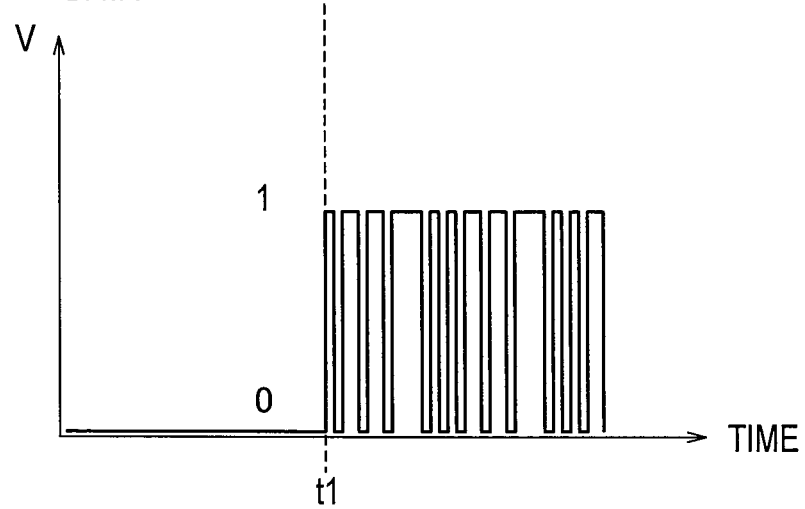

FIG. 18
(a) VOLTAGE FOR EXCITATION OF POWER TRANSMISSION COIL
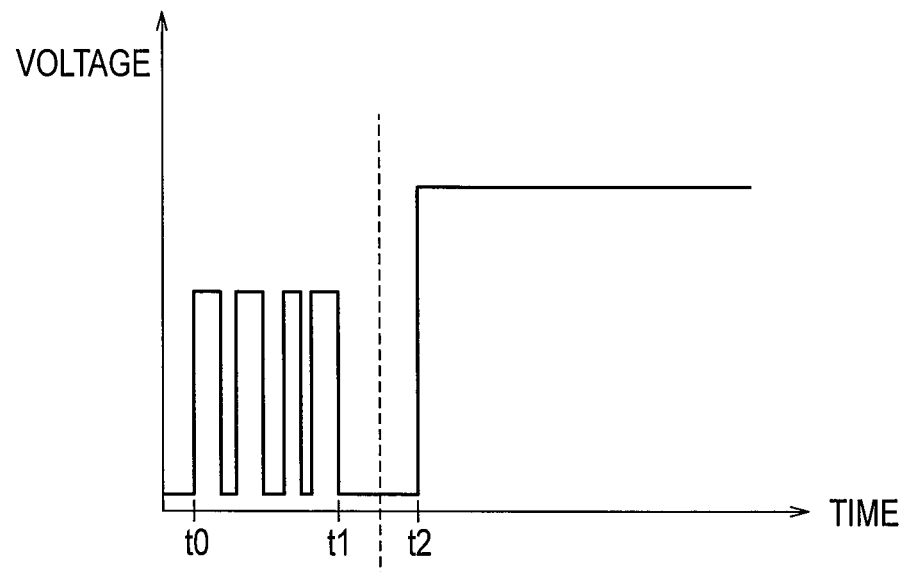
(b) RECEIVED VOLTAGE
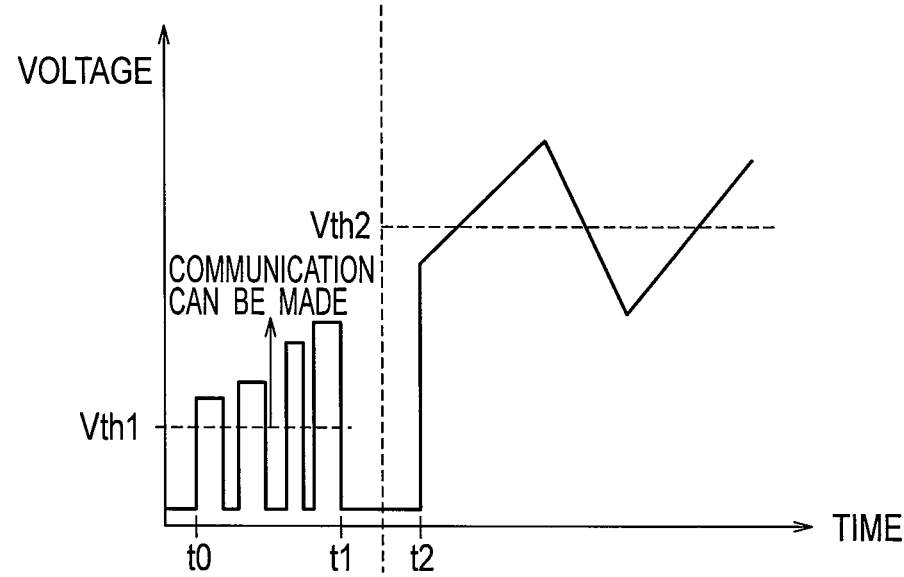

FIG. 20
(a) VOLTAGE RECEIVED BY SUBCOIL SC4
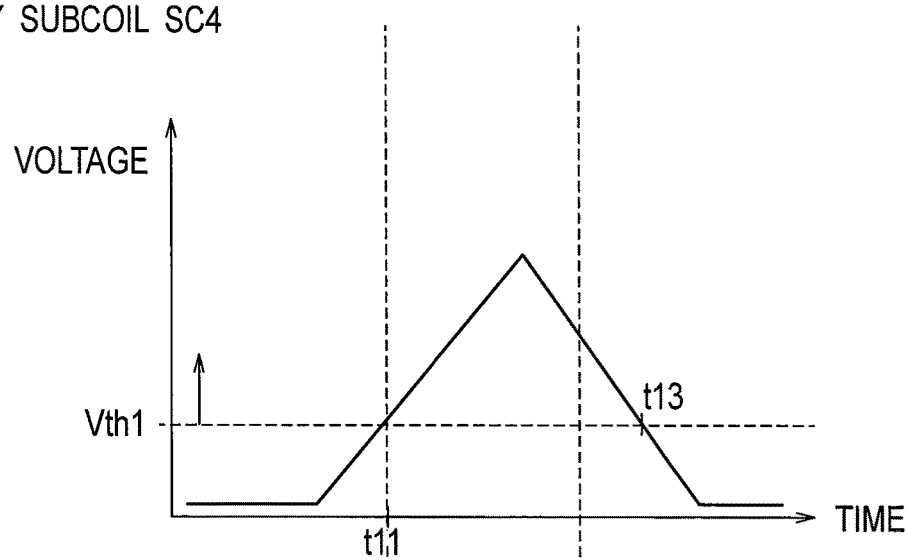
(b) VOLTAGE RECEIVED BY SUBCOIL SC1
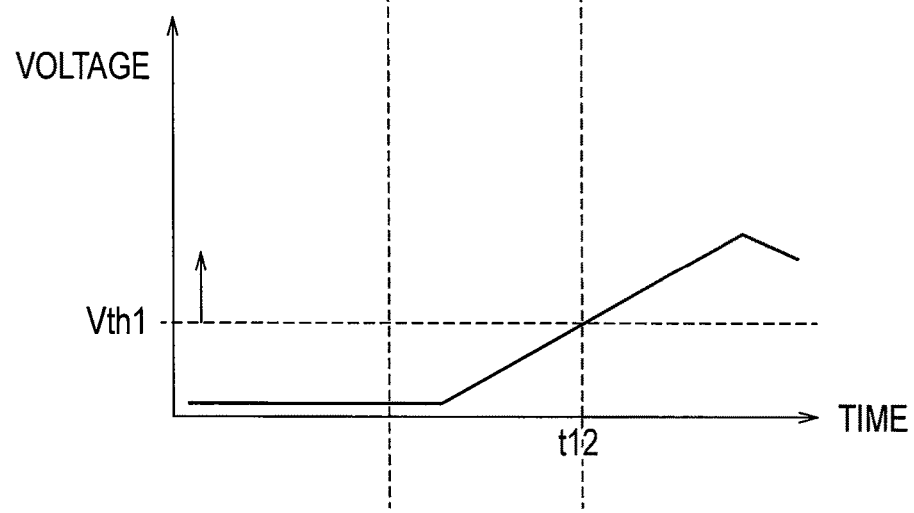

FIG. 21
(a) DATA RECEIVED BY SUBCOIL SC4
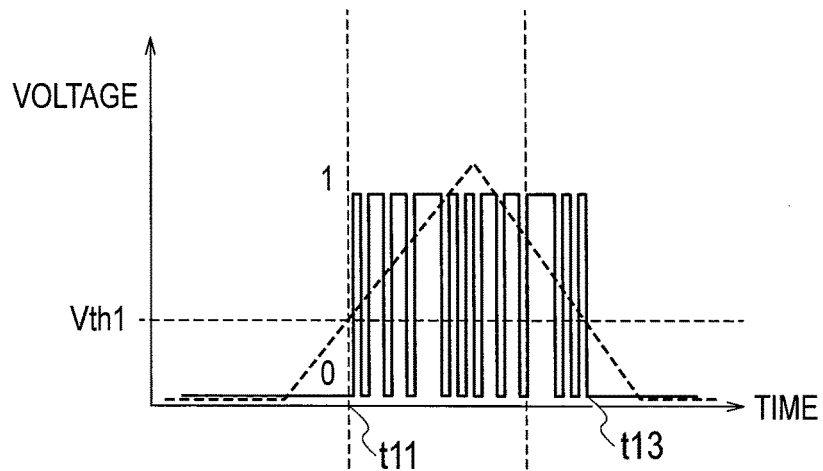
(b) DATA RECEIVED BY SUBCOIL SC1
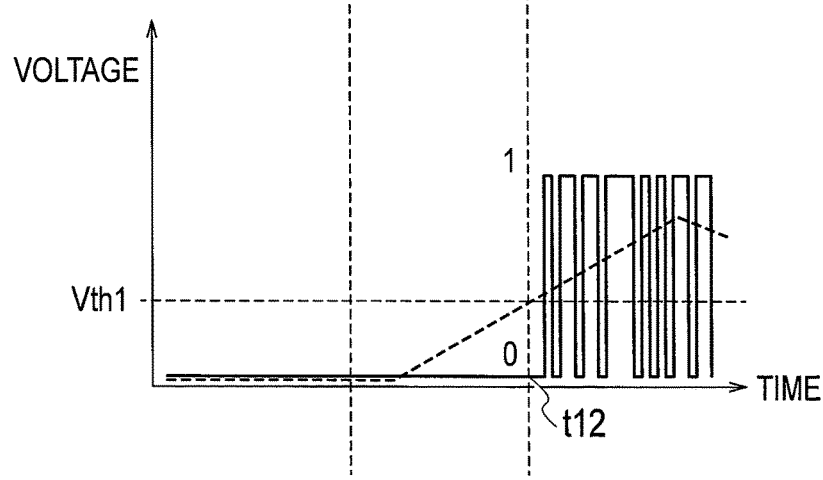
(c) COMBINED DATA
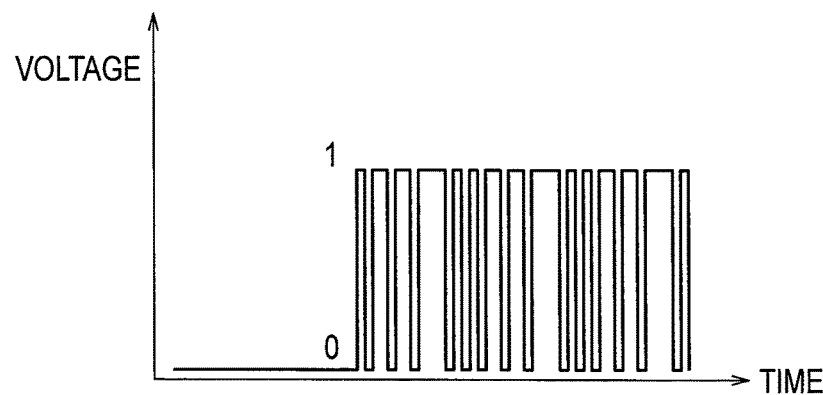

FIG. 24
(a) DATA RECEIVED BY SUBCOIL SC3
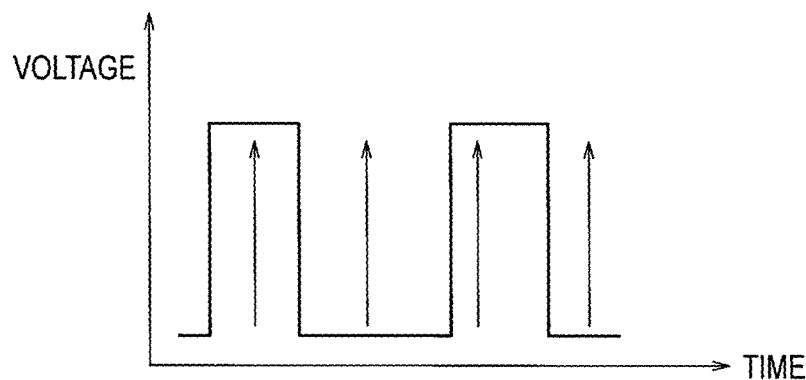
(b) DATA RECEIVED BY SUBCOIL SC4
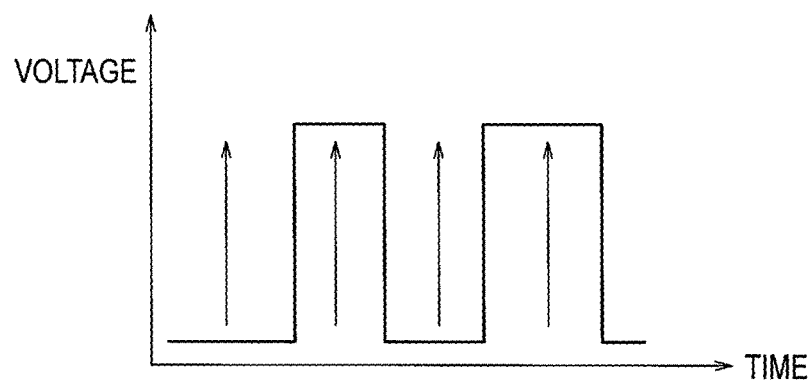
(c) COMBINED DATA
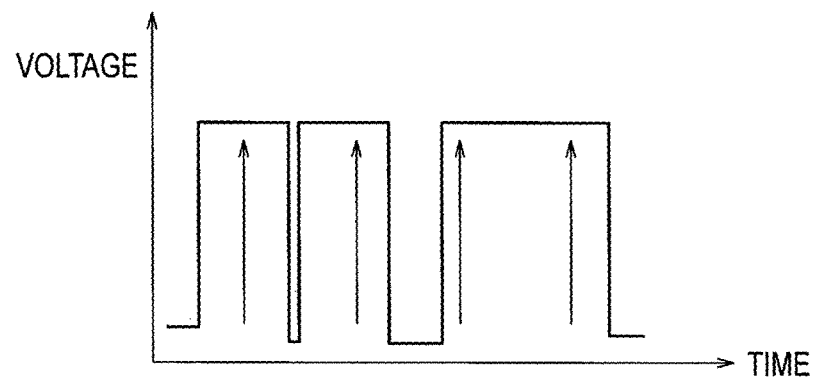

FIG. 26
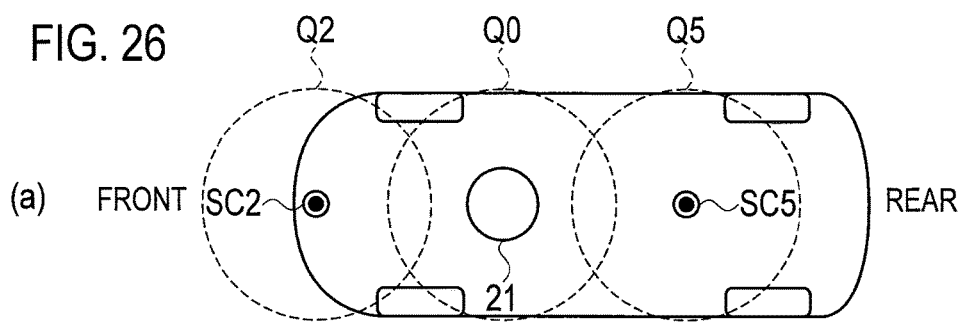
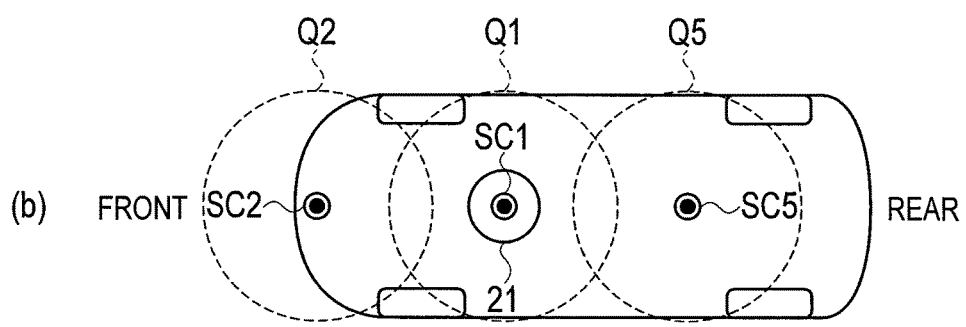
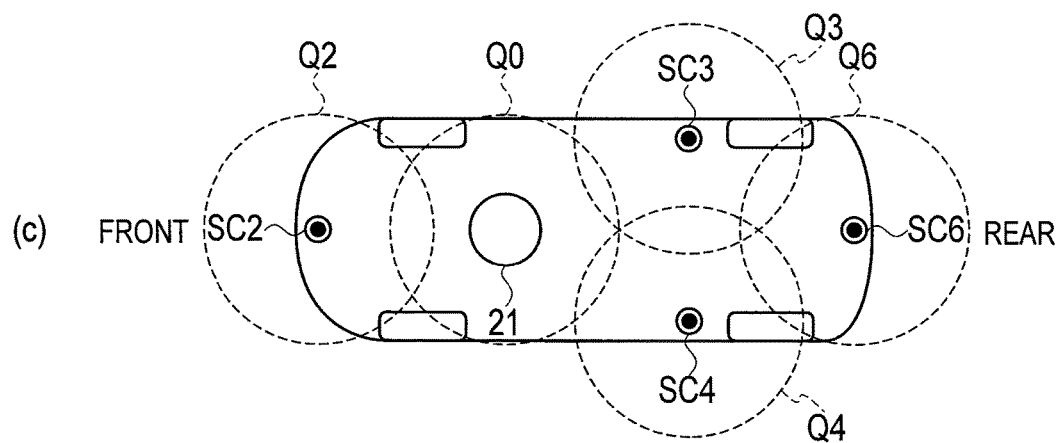
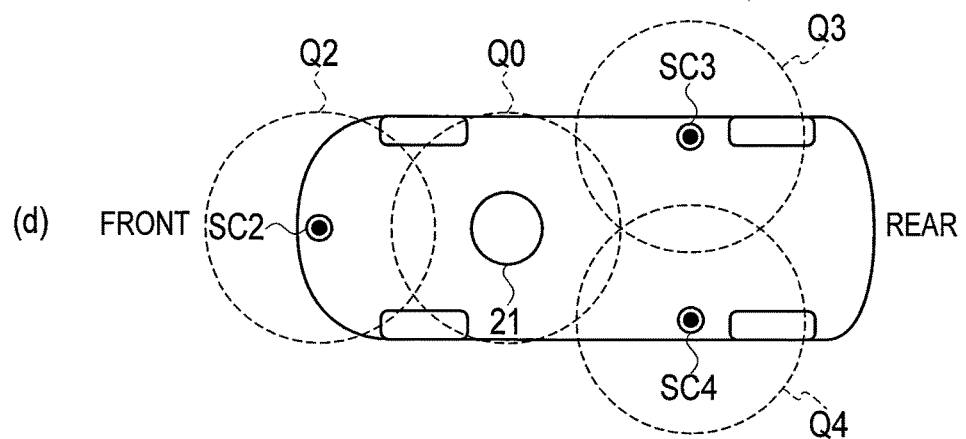

WIRELESS POWER SUPPLY SYSTEM AND WIRELESS POWER RECEPTION DEVICE

TECHNICAL FIELD

The present invention relates to a wireless power supply system and a wireless power reception device for wirelessly supplying power to a vehicle equipped with an electric load such as a battery.

BACKGROUND ART

Heretofore, a wireless charge system disclosed in Patent Literature 1 has been known which is configured to wirelessly supply power to a vehicle equipped with a battery (electric load) to charge the battery. This Patent Literature 1 discloses that, in a case where a plurality of power transmission devices are present, a power transmission coil is weakly excited to generate a random signal, which is detected by a vehicle, and the vehicle and the power transmission device are paired with each other if it is confirmed that the random signals match each other between the vehicle and the power transmission device.

CITATION LIST

Patent Literature

Patent Literature 1: International Publication No. WO2012/042902

SUMMARY OF INVENTION

However, in the configuration in the conventional example disclosed in above Patent Literature 1, in order to perform the pairing, the vehicle enters and stops in the parking space, and in this state a signal containing a random ID pattern is transmitted by the power transmission coil and received by the vehicle. For this reason, a problem arises in that it takes a long time before the vehicle starts to be actually charged after stopping in the parking space.

The present invention has been made to solve this problem in the conventional art, and an object thereof is to provide a wireless power supply system and a wireless power reception device capable of quick pairing with a vehicle entering a parking space.

A wireless power supply system according to one aspect of the present invention includes a power transmission device and a power reception device, and the power transmission device includes a power transmission coil configured to transmit power, a power-supply control unit configured to control power to be supplied to the power transmission coil, and a power-transmission-side communication unit configured to communicate with the power reception device. The power reception device includes a power reception coil configured to receive power transmitted from the power transmission coil and supply the received power to the vehicle as drive force, subcoils provided on a front side and a rear side of the vehicle relative to the power reception coil and configured to receive, as an excitation pattern signal, power transmitted from the power transmission coil, a power-reception control unit configured to control power reception of the power reception coil and the subcoils, and a power-reception-side communication unit configured to communicate with the power transmission device. When the vehicle approaches the parking space, the power-supply control unit performs excitation using an excitation pattern signal containing identification data. The power-reception control unit acquires the identification data from the excitation pattern signal received by the subcoils, and the power-reception-side communication unit transmits the acquired identification data to the power transmission device. The power-supply control unit pairs the power transmission coil and the power reception coil with each other when the identification data contained in the excitation pattern signal and the identification data transmitted from the power-reception control unit match each other. The pairing is canceled if the identification data received by the subcoil provided on the front side and the identification data received by the subcoil provided on the rear side are different from each other.

A wireless power reception device according to one aspect of the present invention includes: a power reception coil configured to supply power received to a vehicle as drive force; at least one subcoil provided on each of a front side and a rear side of the vehicle relative to the power reception coil and configured to receive, as an excitation pattern signal, power transmitted from the power transmission coil of the power transmission device; a power-reception control unit configured to control power reception of the power reception coil and the subcoils; and a power-reception-side communication unit configured to communicate with the power transmission device. When the power transmission device is excited using an excitation pattern signal containing identification data, the power-reception control unit acquires the identification data from the excitation pattern signal received by the subcoils, and transmits the acquired identification data to the power transmission device.

BRIEF DESCRIPTION OF DRAWINGS

FIG. 8 is a set of waveform charts according to the embodiment of the present invention showing voltage received by one of the subcoils and identification data acquired by the subcoil.

FIG. 18 is a set of waveform charts according to the embodiment of the present invention showing voltage for excitation of the power transmission coil and voltage received by one of the subcoils.

FIG. 20 is a set of waveform charts according to the embodiment of the present invention showing changes in the voltages received by two of the subcoils.

FIG. 21 is a set of waveform charts according to the embodiment of the present invention showing a procedure of combining pieces of identification data received by the two subcoils to generate combined data.

FIG. 24 is a set of waveform charts according to the embodiment of the present invention showing pieces of received data received by two of the subcoils and combined data in a situation where the pieces of received data are different from each other.

FIG. 26 is a set of explanatory diagrams showing modifications of the subcoil arrangement.

DESCRIPTION OF EMBODIMENTS

Figure 1:
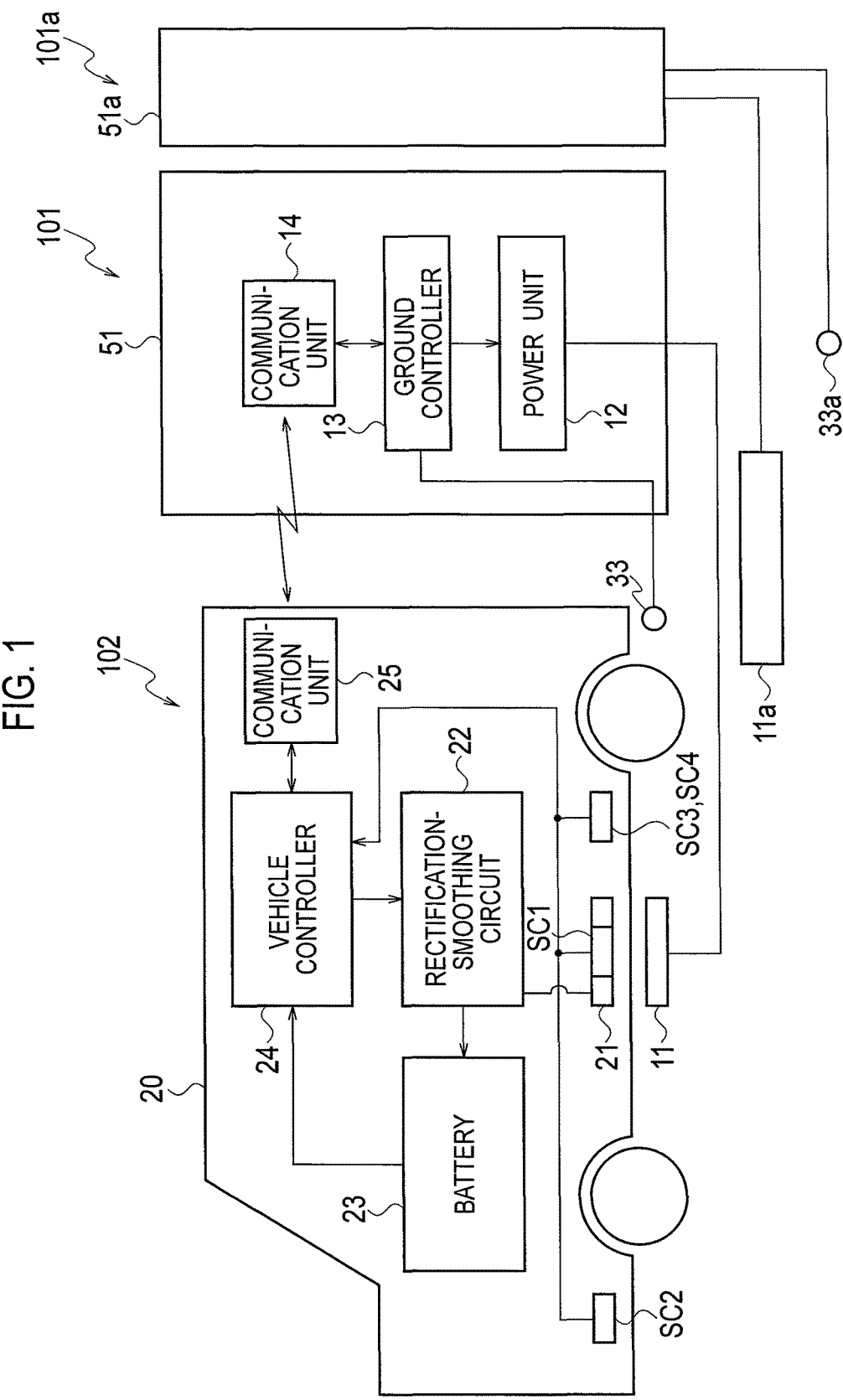
FIG. 1 is a block diagram showing the configuration of a wireless power supply system according to an embodiment of the present invention.

An embodiment of the present invention will be described below with reference to drawings. FIG. 1 is a block diagram showing the configuration of a wireless power supply system according to an embodiment of the present invention. As shown in FIG. 1, this wireless power supply system includes a plurality of power transmission devices (two power transmission devices 101, 101a are shown in FIG. 1 as an example) provided to parking equipment on the ground, and a power reception device 102 mounted on a vehicle 20.

The power transmission device 101 includes a parking space for parking the vehicle 20. The power transmission device 101 also includes a ground unit 51, a power transmission coil 11 installed on the ground of the parking space, and a vehicle detection sensor 33 configured to detect when the vehicle 20 approaches the parking space. Note that FIG. 1 shows the two power transmission devices 101, 101a as an example. The present invention is not limited to this case, but is applicable to cases where three or more power transmission devices are provided.

The ground unit 51 includes: a power unit 12 configured to excite the power transmission coil 11 by causing current to flow therethrough; a ground controller 13 (power-supply control unit) configured to control the actuation of the power unit 12; and a communication unit 14 (power-transmission-side communication unit) configured to perform wireless communication with the power reception device 102. The power unit 12 performs control such that an excitation pattern signal formed by excitation of a certain pattern is transmitted from the power transmission coil 11. Meanwhile, the power transmission device 101a also has a similar configuration, and includes a ground unit 51a, a power transmission coil 11a, and a vehicle detection sensor 33a. Note that the ground controller 13 can be constructed as an integrated computer including a central processing unit (CPU) and storage means such as an RAM, an ROM, and a hard disk drive, for example.

The power reception device 102, mounted on the vehicle 20, includes a power reception coil 21 installed at an appropriate position on the bottom of the vehicle 20, and a rectification-smoothing circuit 22 configured to rectify and smooth AC voltage received by the power reception coil 21. The power reception device 102 further includes a vehicle controller 24 (power-reception control unit) configured to control the actuation of the rectification-smoothing circuit 22, a battery 23 (electric load) configured to be charged with the voltage received by the power reception coil 21, and a communication unit 25 (power-reception-side communication unit) configured to communicate with the ground unit 51. The power reception coil 21 is disposed at such a position as to face the above-mentioned power transmission coil 11 when the vehicle 20 is parked at a predetermined position in the parking space. The power reception coil 21 supplies power it receives to the battery 23. That is, the power reception coil 21 supplies the received power to the vehicle 20 as drive force.

The power reception device 102 further includes subcoils SC1, SC2, SC3, SC4 installed at the bottom of the vehicle 20. These subcoils SC1 to SC4 are configured to receive an excitation pattern signal outputted from the power transmission coil 11 and output it to the vehicle controller 24 while the vehicle 20 is moved and until the vehicle 20 is stopped at the predetermined position in the parking space. The arrangement of the subcoils SC1 to SC4 will be described later. Note that the vehicle controller 24 can be constructed as an integrated computer including a central processing unit (CPU) and storage units such as an RAM, an ROM, and a hard disk drive, for example.

Figure 2:
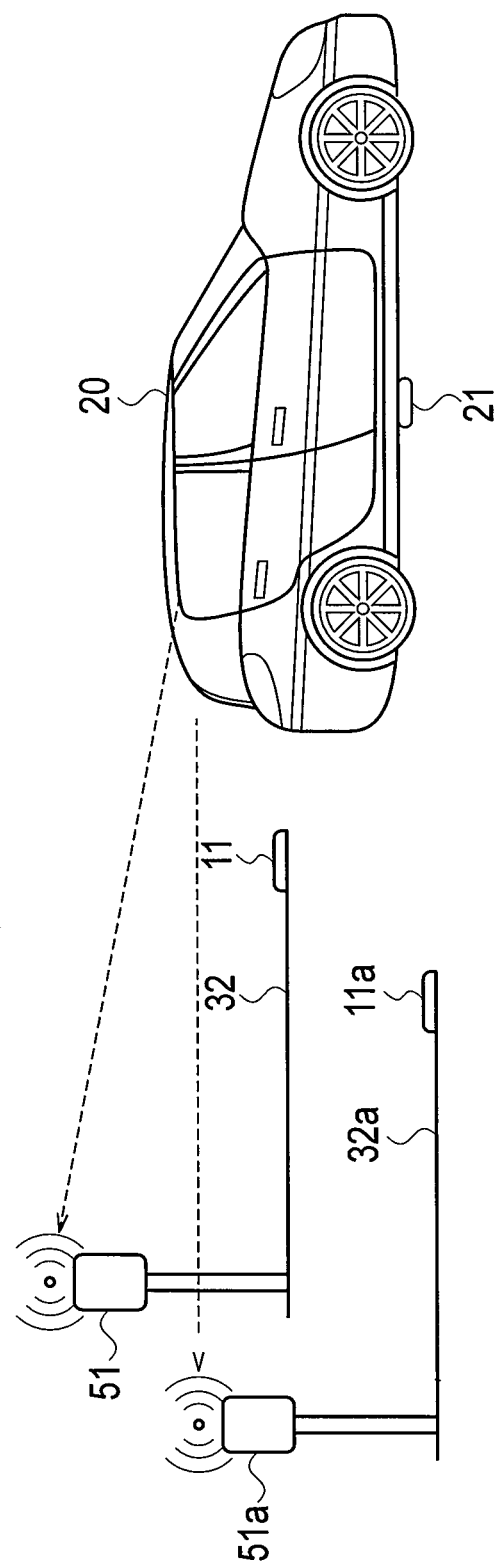
FIG. 2 is an explanatory diagram showing the relation between a vehicle and a plurality of parking spaces.

FIG. 2 is an explanatory diagram showing the relation between the vehicle 20 and a plurality of parking spaces 32, 32a. In this embodiment, a process of pairing the power reception device 102, mounted on the vehicle 20, and the power transmission device 101, corresponding to the parking space 32, at which the vehicle 20 is to be parked, is performed through wireless communication between the ground units 51, 51a, provided to at the parking spaces 32, 32a, and the power reception device 102. The power transmission coil 11 of the power transmission device 101 after being paired with the vehicle 20 is energized to transmit power. The power reception device 102 receives this power and charges the battery 23 (see FIG. 1), mounted on the vehicle 20.

Figure 3:
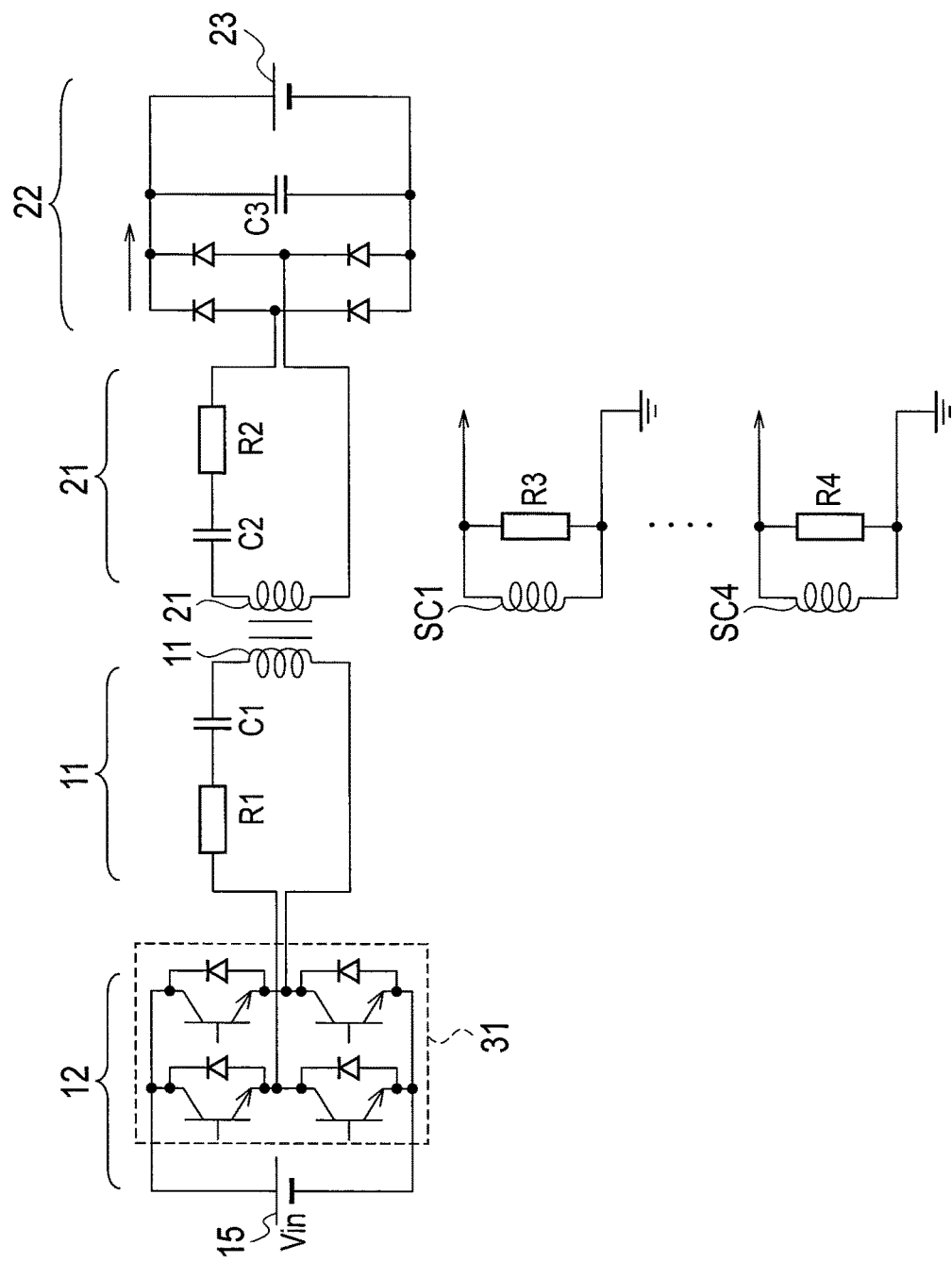
FIG. 3 is a circuit diagram of a power unit, a power transmission coil, a power reception coil, subcoils, and a rectification-smoothing circuit of the wireless power supply system according to the embodiment of the present invention.

FIG. 3 is a circuit diagram showing detailed configurations of the power unit 12, the power transmission coil 11, the power reception coil 21, the rectification-smoothing circuit 22, and the subcoils SC1 to SC4, which are shown in FIG. 1, and peripheral elements thereof. As shown in FIG. 3, the power unit 12 includes an inverter circuit 31 formed of a plurality of switch circuits (such for example as semiconductor elements). Moreover, the on and off of each switch circuit are controlled under control of the ground controller 13 (see FIG. 1) such that a DC voltage Vin supplied from a DC power source 15 is converted into an AC voltage of a predetermined frequency.

A resistor R1 and a capacitor C1 are connected to the power transmission coil 11. By applying the AC voltage outputted from the power unit 12 to the power transmission coil 11 and thereby causing a current to flow therethrough, the power transmission coil 11 can be set to one of first excitation which is excitation for pairing to be described later and second excitation which is excitation for positioning of the vehicle 20. Further, if the power transmission coil 11 and the power reception coil 21 are situated to face each other as shown in FIG. 1, the power transmission coil 11 is set to third excitation which is excitation for battery charging, to thereby wirelessly transmit power for battery charging to the power reception coil 21.

The power reception coil 21 is connected to a capacitor C2 and a resistor R2, and wirelessly receives the power transmitted from the power transmission coil 11. The rectification-smoothing circuit 22 includes a bridge circuit formed of a plurality of diodes, and a capacitor C3. The rectification-smoothing circuit 22 converts the AC voltage received by the power reception coil 21 into a DC voltage and further smoothes it and then supplies it to the battery 23.

Upon receipt of an excitation pattern signal outputted from the power transmission coil 11, the subcoils SC1 to SC4 output this excitation pattern signal to the vehicle controller 24, shown in FIG. 1. Specifically, as the vehicle 20 enters the parking space 32, at least one of the subcoils SC1 to SC4 approaches the power transmission coil 11 with the movement of the vehicle 20, and the subcoil SC1 to SC4 then receives an excitation pattern signal outputted from the power transmission coil 11 and outputs this excitation pattern signal to the vehicle controller 24.

Figures 4, 5:
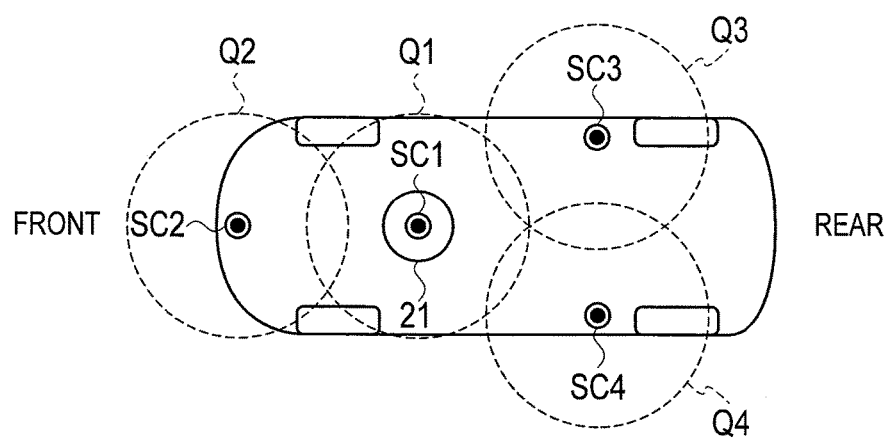
FIG. 4 is an explanatory diagram showing the arrangement of the power reception coil and the subcoils of the wireless power supply system according to the embodiment of the present invention.
FIG. 5 is an explanatory diagram showing a data string of a pairing signal used in the wireless power supply system according to the embodiment of the present invention.
Figure 6:
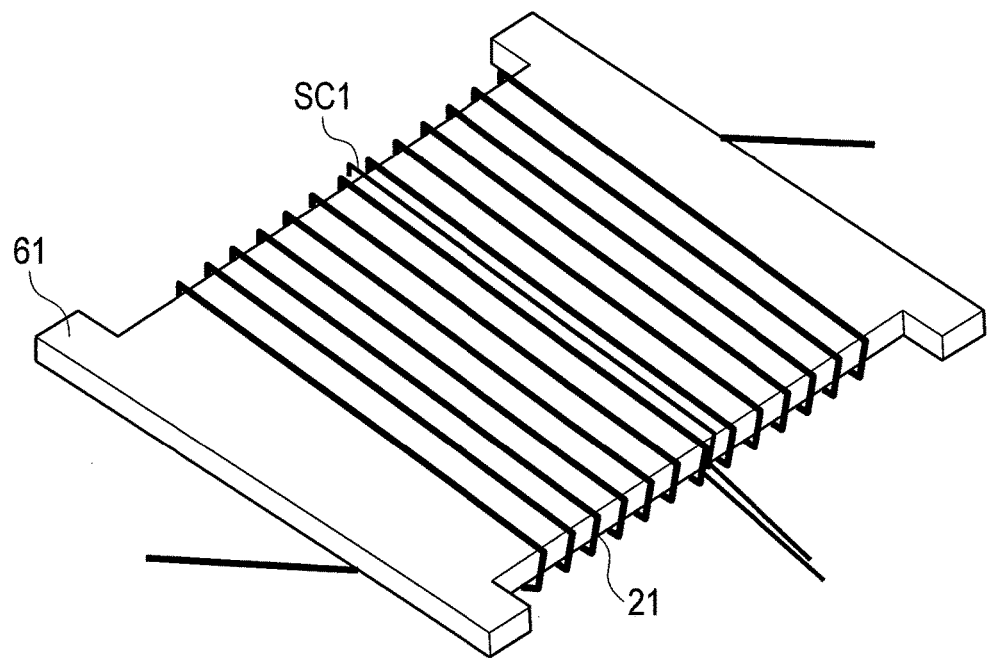
FIG. 6 is a perspective view showing the configuration of the power reception coil and one of the subcoils used in the wireless power supply system according to the embodiment of the present invention.

FIG. 4 is an explanatory diagram showing the arrangement of the power reception coil 21 and the subcoils SC1 to SC4, mounted at the bottom of the vehicle 20, and the signal receivable range of each of the subcoils SC1 to SC4. As shown in FIG. 4, the subcoil SC2 is provided on the front side of the vehicle 20 relative to the power reception coil 21, and the two subcoils SC3, SC4 are provided on the rear side of the vehicle 20 relative to the power reception coil 21. Further, the subcoil SC1 is provided at the same position as the power reception coil 21. The subcoil SC1 is wound around the same core as the power reception coil 21. Specifically, as shown in FIG. 6, the power reception coil 21 is helically wound around a plate-shaped ferrite core 61, and the subcoil SC1 is also wound around this ferrite core 61 at its substantially center portion.

As shown in FIG. 4, the signal receivable ranges of the subcoils SC1, SC2, SC3, SC4 are denoted by Q1, Q2, Q3, Q4, respectively. If any of the signal receivable ranges is situated to overlap the excitation range of the power transmission coil 11, an excitation pattern signal outputted from the power transmission coil 11 can be received. Here, the signal receivable ranges of those subcoils adjacent to each other overlap each other partially. Specifically, the signal receivable ranges Q1, Q2 overlap each other partially. Likewise, the signal receivable ranges Q1, Q3, the signal receivable ranges Q1, Q4, and the signal receivable ranges Q3, Q4 overlap each other partially. The reason for the partial overlap between the signal receivable ranges is to prevent disconnection of the communication of the excitation pattern signal between the power transmission coil 11 and the subcoils SC1 to SC4 while the vehicle 20 is moving toward the predetermined position in the parking space 32.

In this embodiment, the power transmission coil 11 is set to the first excitation when the vehicle 20 approaches the parking space 32. In the first excitation, as will be described later, an excitation pattern signal containing a pairing signal is outputted. Then, pairing is performed between the power reception device 102 and the power transmission device 101 based on the pairing signal contained in the excitation pattern signal received by at least one of the subcoils SC1 to SC4. Further, after the pairing is completed, the power transmission coil 11 is set to the second excitation and whether or not the vehicle 20 is parked at the predetermined position in the parking space 32 is determined from the intensity of the excitation pattern signal received by the subcoil SC1. Thereafter, if it is determined that the vehicle 20 is parked at the predetermined position in the parking space 32, the power transmission coil 11 is set to the third excitation to wirelessly supply power.

Here, the power supplied to the power transmission coil 11 in the second excitation is higher than the power supplied to the power transmission coil 11 in the first excitation. This is to prevent the vehicle controller 24 from falsely recognizing that the power transmission coil 11 is set to the second excitation while the power transmission coil 11 is set to the first excitation.

The first excitation will be described below with reference to a data string shown in FIG. 5. In the first excitation, the power transmission coil 11 is excited in a pattern containing a pairing signal formed of a data string of a start bit, an ID, a data-length code, identification data, a sum value, and a stop bit. Thus, the excitation pattern signal to be outputted from the power transmission coil 11 contains the pairing signal shown in FIG. 5.

In the identification data contained in the pairing signal, a unique bit string is set which has been assigned to the corresponding parking space. For example, "1, 0, 1, 0" is set in the case of four-bit data. The ground controller 13 controls the current flowing into the power transmission coil 11 such that the pairing signal shown in FIG. 5 can be contained. In sum, in the first excitation, the power transmission coil 11 is excited with an excitation pattern signal containing the identification data.

When a current modulated with the data string of the pairing signal shown in FIG. 5 flows through the power transmission coil 11, the pairing signal is received by the subcoil(s) among the subcoils SC1 to SC4 whose signal receivable range is overlapping the excitation range of the power transmission coil 11. This pairing signal is supplied to the vehicle controller 24, shown in FIG. 1.

The vehicle controller 24 reads the data string out of the pairing signal contained in the excitation pattern signal received by the subcoil(s) and recognizes the identification data. The vehicle controller 24 then transmits the recognized identification data to the communication unit 14 through the communication unit 25. If the identification data transmitted by the power transmission coil 11 and the identification data received by the communication unit 14 match each other, the ground controller 13 pairs this parking space and the vehicle 20.

Meanwhile, if a plurality of subcoils among the subcoils SC1 to SC4 receive data strings, these data strings are ORed. Here, if the data strings received by the plurality of subcoils are the pairing signal transmitted from the same power transmission coil 11, ORing them will result in the same data string. Specifically, if the identification data contained in a pairing signal is "1, 0, 1, 0" and a plurality of subcoils receive this pairing signal, then ORing the identification data "1, 0, 1, 0" contained in each pairing signal will result in "1, 0, 1, 0". Thus, pairing can be performed using this identification data.

On the other hand, if for example the identification data contained in a pairing signal received by the subcoil SC3 and the identification data contained in a pairing signal received by the subcoil SC4 are different from each other, then ORing them will not result in the same identification data. For example, if the identification data contained in the pairing signal received by the subcoil SC3 is "0, 1, 0, 1" whereas the identification data contained in the pairing signal received by the subcoil SC4 is "1, 0, 1, 0", then ORing them will result in "1, 1, 1, 1". This data is invalid data, and the sum value therefore indicates an error. If the sum value indicates an error, the vehicle controller 24 cancels the pairing. Details will be described later.

Figure 7:
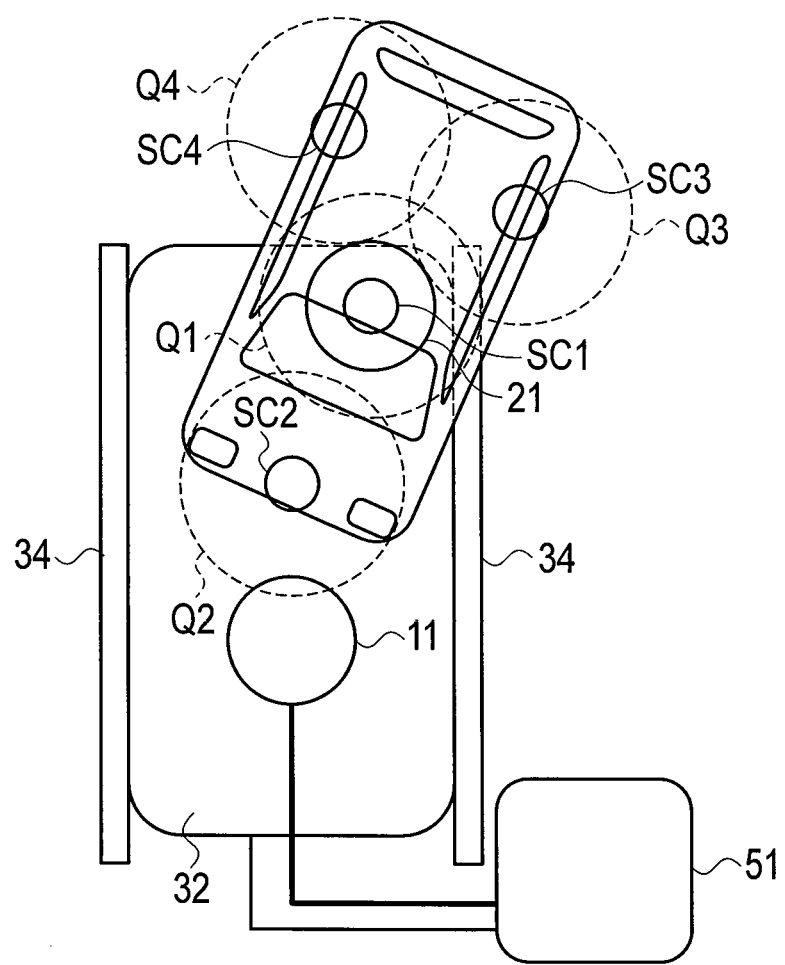
FIG. 7 is an explanatory diagram according to the embodiment of the present invention showing a state where the vehicle has approached one of the parking spaces.

Next, description will be given of the change in the voltage received by the subcoil SC2 (the subcoil mounted on the front side of the vehicle 20) when the vehicle 20 moves forward and enters the parking space 32 between parking lines 34, with reference to an explanatory diagram shown in FIG. 7 and waveform charts shown in FIG. 8. As the vehicle 20 enters the parking space 32 and the signal receivable range Q2 of the subcoil SC2 partially overlaps the excitation range of the power transmission coil 11, the voltage received by the subcoil SC2 gradually rises from a time t0 and then drops, as shown in Part (a) of FIG. 8. Once the voltage received by the subcoil SC2 exceeds a first threshold voltage Vth1 at a time t1, the data string of the pairing signal can be recognized. Specifically, as shown in Part (b) of FIG. 8, the data string of a pairing signal that varies between "0" and "1" is acquired from the time t1. Pairing can then be performed between the vehicle 20 and the parking space 32 by using this data string.

Figure 9:
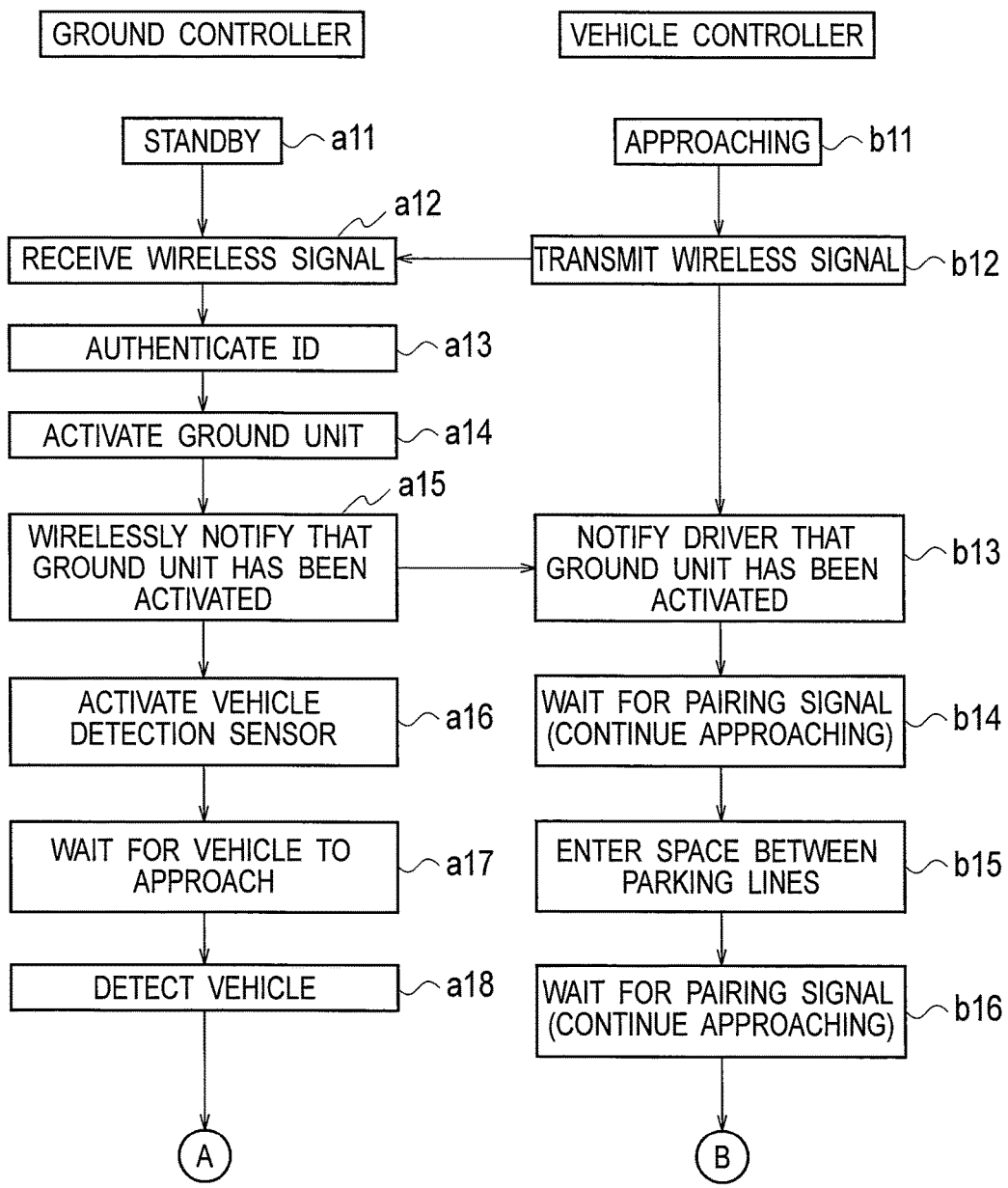
FIG. 9 is the first part of a flowchart showing the procedure of processing by the wireless power supply system according to the embodiment of the present invention.
Figure 10:
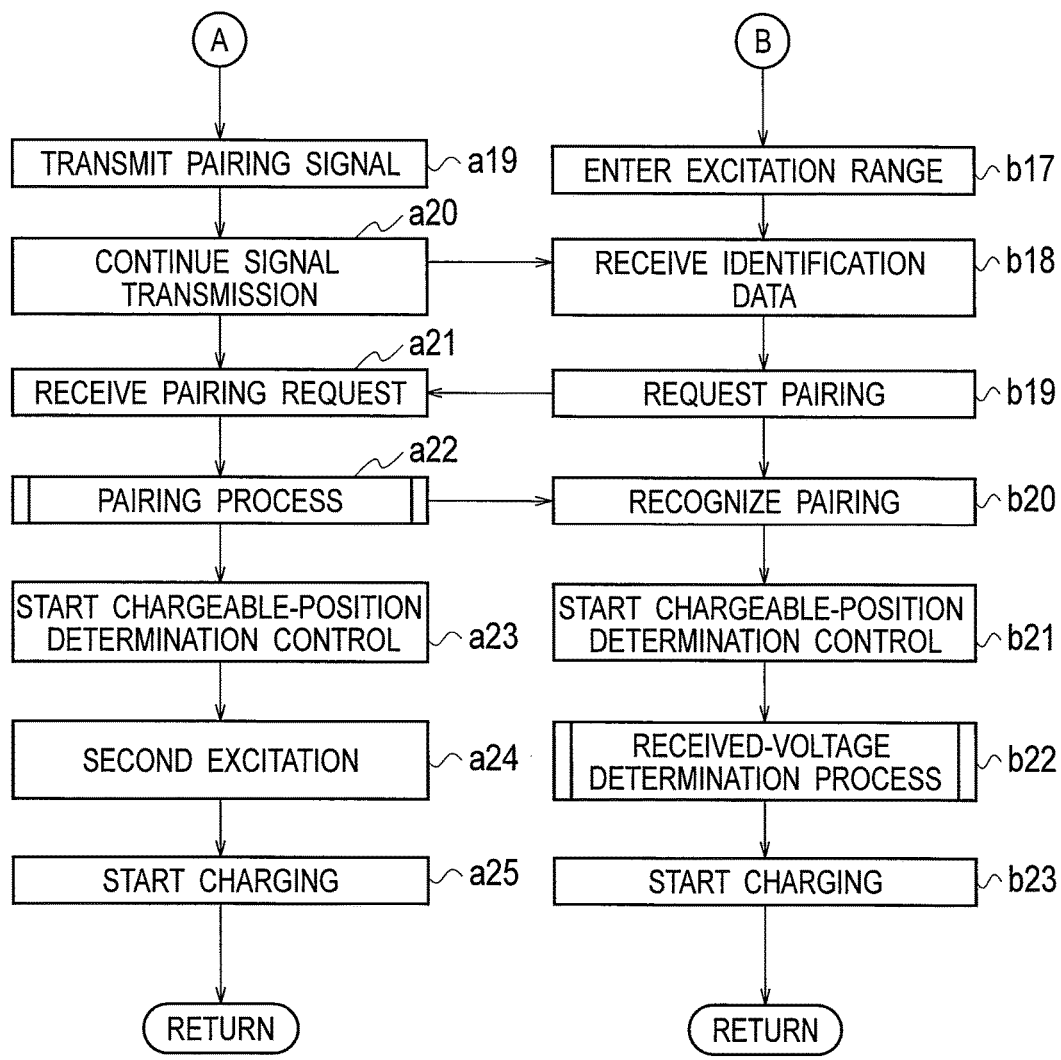
FIG. 10 is the second part of the flowchart showing the procedure of the processing by the wireless power supply system according to the embodiment of the present invention.

Next, description will be given of operation from when the vehicle 20 approaches the parking space 32 to when the vehicle 20 stops at the predetermined position in the parking space 32, with reference to a flowchart shown in FIG. 9 and FIG. 10 and explanatory diagrams shown in FIG. 14 to FIG. 17.

Figure 14:
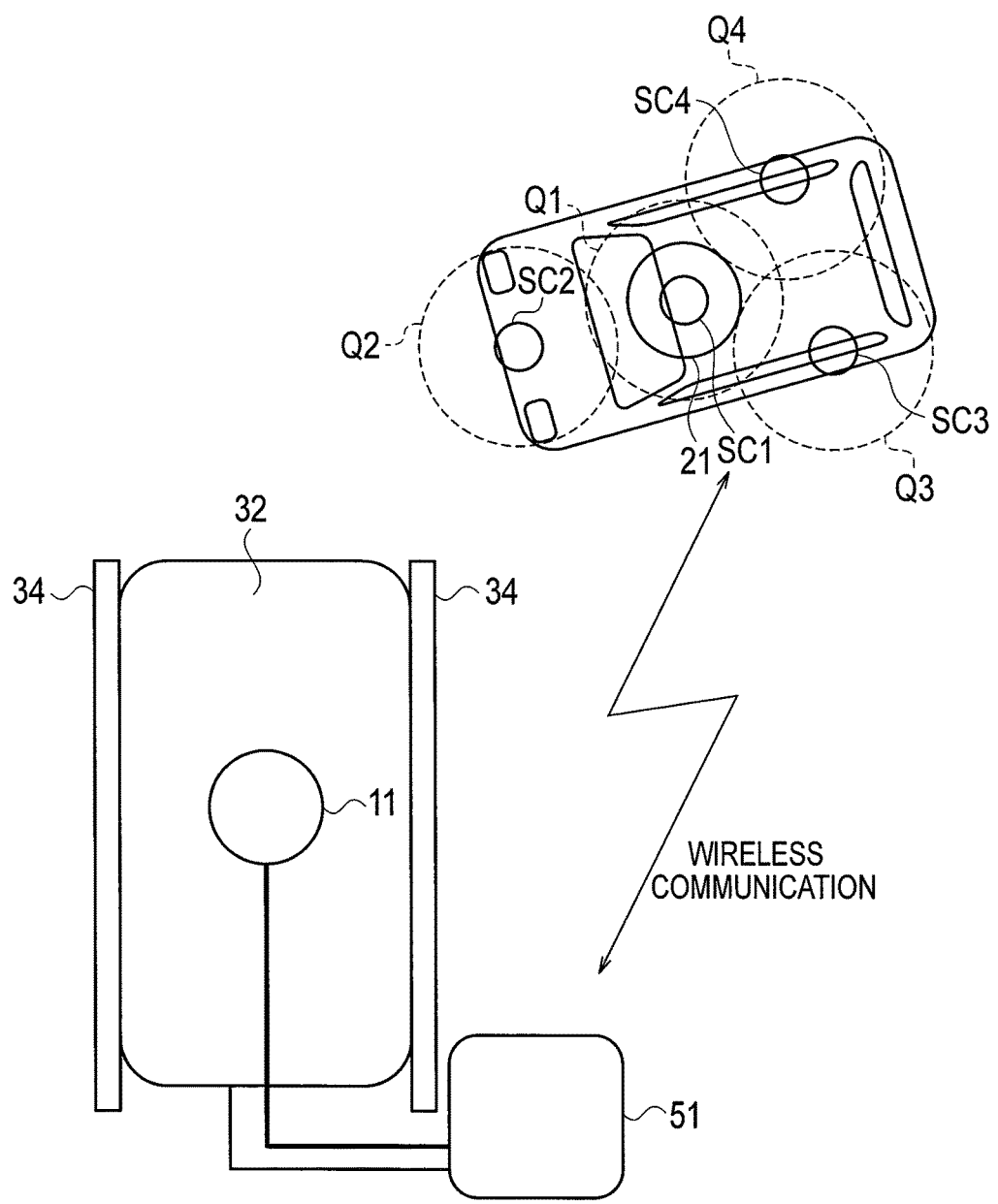
FIG. 14 is an explanatory diagram according to the embodiment of the present invention showing a state where the vehicle is approaching one of the parking spaces.

FIG. 14 shows a state where the vehicle 20 is approaching the parking space 32 between the parking lines 34. In this state, the ground controller 13 is on standby (Step a11 in FIG. 9) and the vehicle controller 24 is approaching the parking space 32 (Step b11). Then, the vehicle controller 24 transmits a wireless signal containing a vehicle ID from the communication unit 25 through communication using a LAN (Local Area Network) or the like (Step b12).

Upon receipt of this wireless signal, the communication unit 14 of the ground unit 51 recognizes that the vehicle ID contained in the wireless signal is a valid vehicle ID (Step a13). Then, the ground unit 51 is activated (Step a14), and the vehicle controller 24 is notified with a wireless signal that the ground unit 51 has been activated (Step a15).

The vehicle controller 24 notifies the driver of the vehicle 20 by means of a display (not shown) or the like that the ground unit 51 has been activated (Step b13). In this way, the driver can recognize that the ground unit 51 has been activated. The vehicle controller 24 waits for a pairing signal (Step b14).

After the ground unit 51 is activated, the ground controller 13 activates the vehicle detection sensor 33 (Step a16). The ground controller 13 waits for the vehicle 20 to approach (Step a17).

Figure 15:
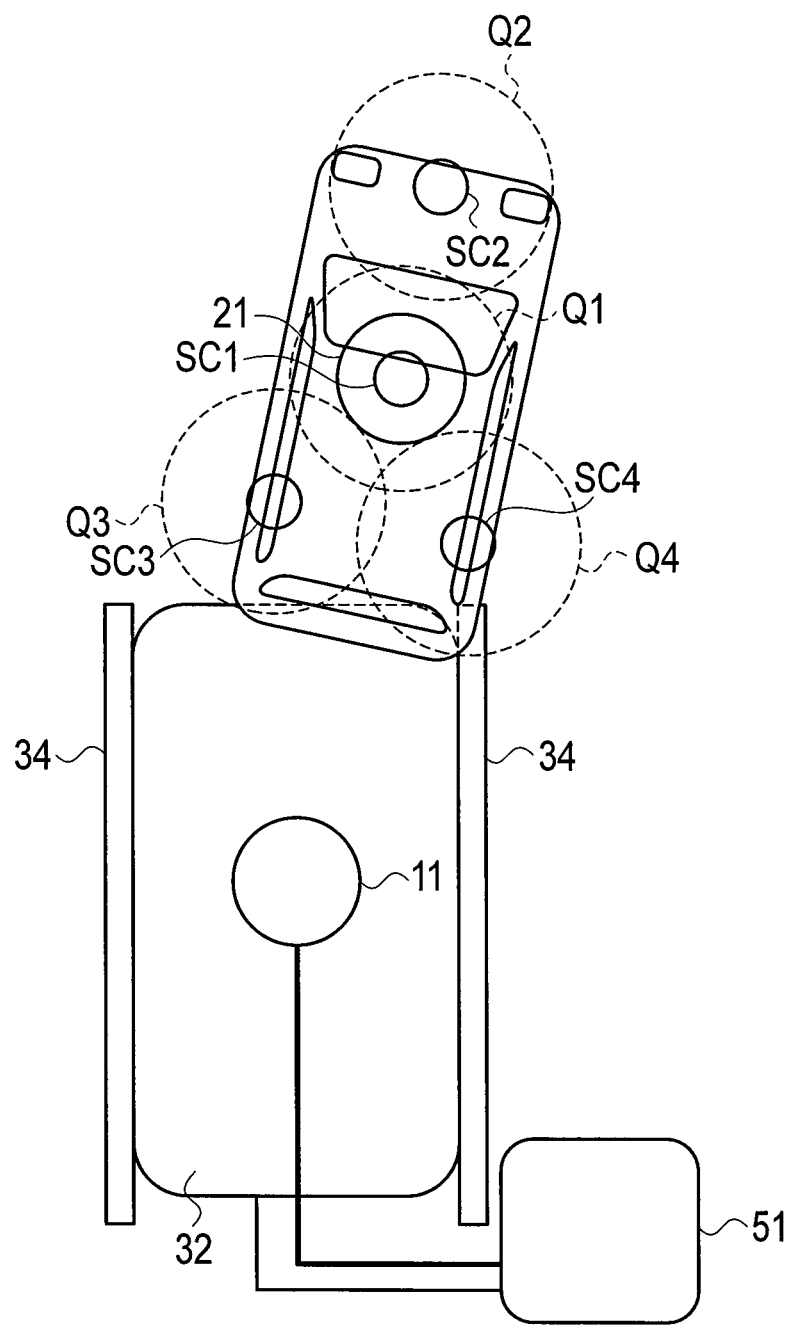
FIG. 15 is an explanatory diagram according to the embodiment of the present invention showing a state where the vehicle is entering the parking space.

When part of the vehicle 20 then enters the parking space 32 between the parking lines as shown in FIG. 15 (Step b15), the vehicle detection sensor 33 detects the entrance of the vehicle 20 into the parking space 32 (Step a18). The ground controller 13 sets the power transmission coil 11 to the first excitation by using an excitation pattern signal containing a pairing signal (Step a19 in FIG. 10). Further, the ground controller 13 continues the first excitation (Step a20). At this point, the vehicle controller 24 is waiting for a pairing signal (Step b16).

Figure 16:
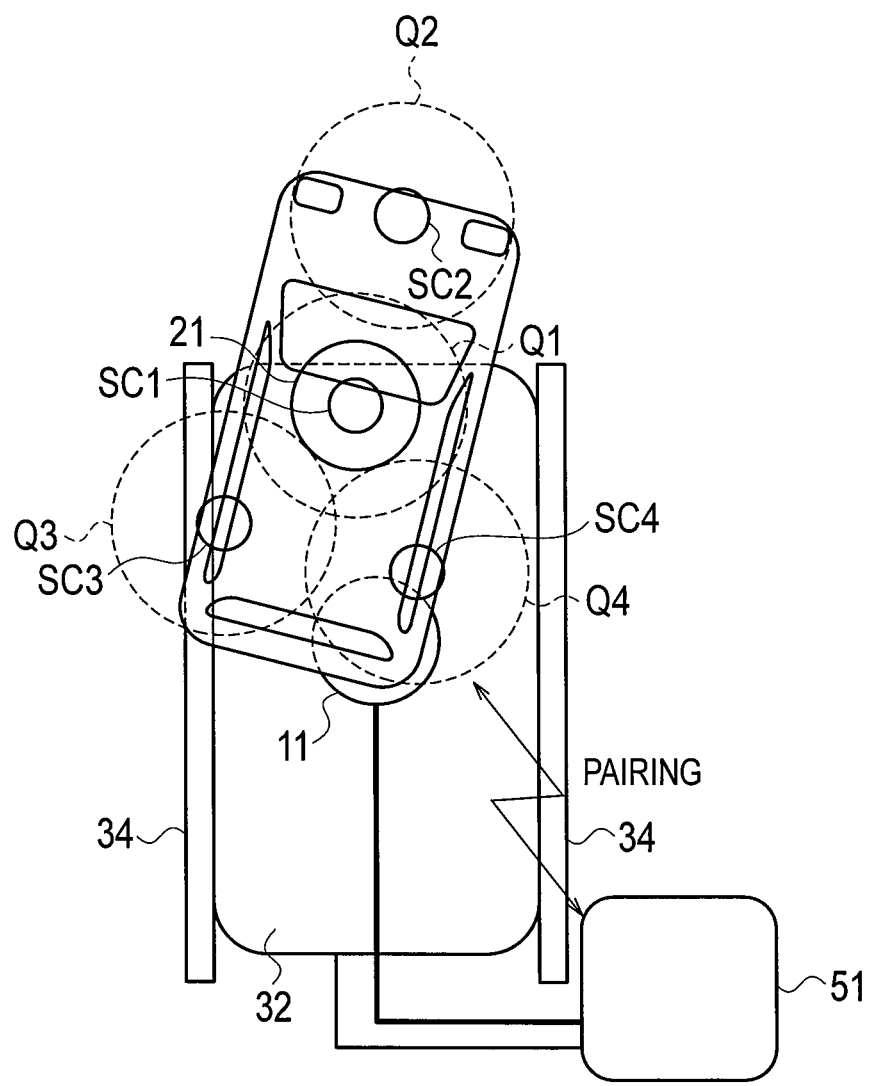
FIG. 16 is an explanatory diagram according to the embodiment of the present invention showing a state where the vehicle has entered the parking space.

Then, as shown in FIG. 16, the vehicle 20 approaches the power transmission coil 11 in the parking space 32 and the signal receivable range Q4 of the subcoil SC4 reaches such a position as to overlap the excitation range of the power transmission coil 11 (Step b17). As a result, the subcoil SC4 receives a pairing signal, and the vehicle controller 24 recognizes the identification data contained in this pairing signal (Step b18).

The vehicle controller 24 transmits the recognized identification data through the communication unit 25 to request the ground controller 13 to perform pairing (Step b19). Upon receipt of the identification data (Step a21), the ground controller 13 determines whether or not the identification data contained in the pairing signal transmitted by the first excitation and the identification data transmitted from the vehicle controller 24 match each other. If they match each other, the power reception device 102 and the power transmission device 101 are paired with each other (Step a22). Details of the pairing process will be described later. Then, the ground controller 13 starts chargeable-position determination control (Step a23).

The vehicle controller 24 recognizes that the pairing has been done (Step b20), and starts chargeable-position determination control (Step b21).

The ground controller 13 controls the current flowing into the power transmission coil 11 such that the power transmission coil 11 can be set to the second excitation (Step a24). Then, the ground controller 13 shifts to wireless charging (Step a25). The vehicle controller 24 determines the level of the voltage received by the subcoil SC1, provided near the power reception coil 21 (Step b22). Details of this received-voltage determination process will be described later.

Figure 17:
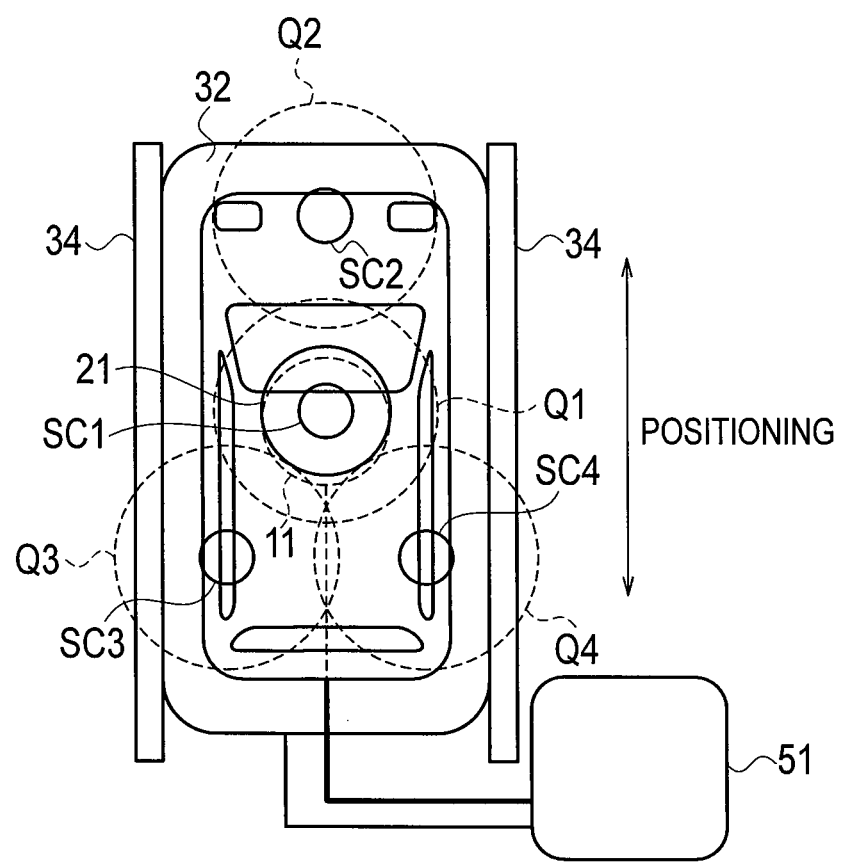
FIG. 17 is an explanatory diagram according to the embodiment of the present invention showing a state where the vehicle is stopped at a predetermined position in the parking space.

Then, the vehicle controller 24 shifts to wireless charging (Step b23) if the vehicle 20 is stopped at the predetermined position in the parking space 32, that is, if the vehicle 20 reaches such a position that the power transmission coil 11 and the power reception coil 21 face each other, as shown in FIG. 17.

Next, a detailed procedure of the received-voltage determination process, shown in Step b22 in FIG. 10, will be described with reference to a flowchart shown in FIG. 11. When the received-voltage determination process starts, the ground controller 13 sets the power transmission coil 11 to the second excitation. Specifically, the ground controller 13 excites the power transmission coil 11 with a voltage higher than that in the above-mentioned first excitation and transmits power from this power transmission coil 11.

Figure 11:
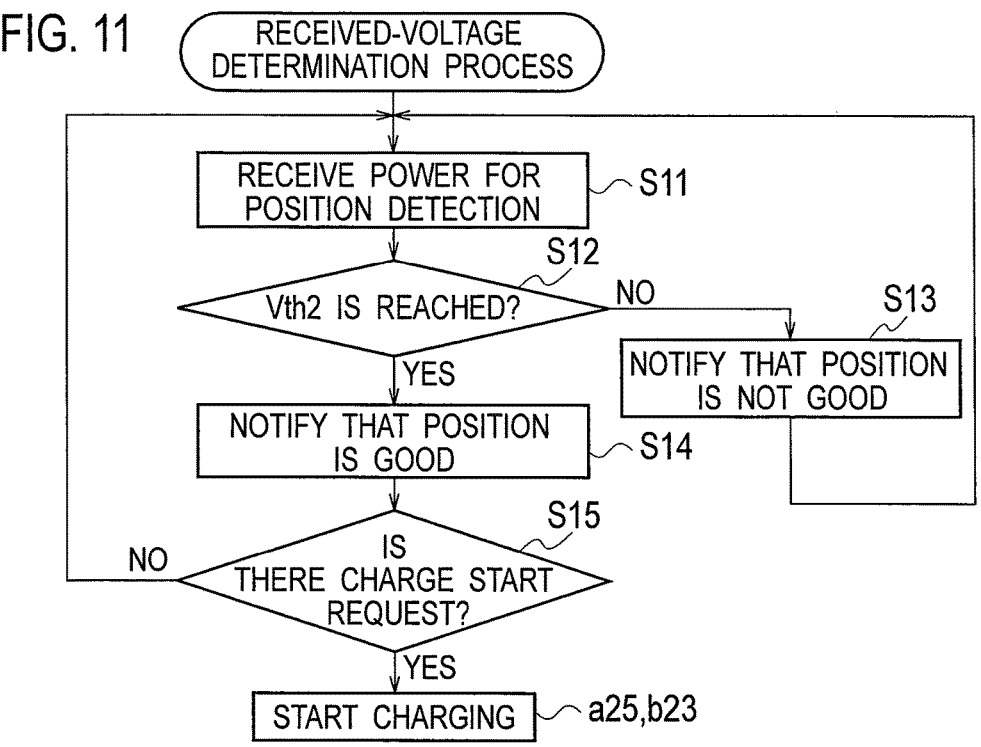
FIG. 11 is a flowchart showing the procedure of a received-voltage determination process by the wireless power supply system according to the embodiment of the present invention.

In Step S11 in FIG. 11, the subcoil SC1, provided by the power reception coil 21, receives the power generated by the second excitation. Then, the vehicle controller 24 determines whether or not the voltage of this power has reached a preset second threshold voltage Vth2 (>Vth1).

If the voltage has not yet reached the second threshold voltage Vth2 (NO in Step S12), the vehicle controller 24 determines that the stop position of the vehicle 20 has not yet reached the predetermined position, notifies the driver accordingly in Step S13, and brings the process back to Step S11.

On the other hand, if the voltage received by the subcoil SC1 has reached the threshold voltage Vth2 (YES in Step S12), the vehicle controller 24 determines that the vehicle 20 has been reached at the predetermined position. Then, in Step S14, the vehicle controller 24 notifies the driver that the stop position of the vehicle has reached a chargeable position, by displaying such information on the display (not shown) or the like. Seeing this display, the driver stops the vehicle 20.

In other words, the larger the area of the overlap between the power transmission coil 11 and the subcoil SC1, the larger the voltage received by the subcoil SC1. Thus, by monitoring the voltage received by the subcoil SC1, it is possible to determine whether or not the vehicle 20 is stopped at the predetermined position (chargeable position) in the parking space 32.

In Step S15, the vehicle controller 24 determines whether or not the driver has inputted a charge start request. If the driver has inputted a charge start request (YES in Step S15), charging of the battery 23 is started in Steps a25, b23.

The above processing will be described with reference to Parts (a), (b) of FIG. 18. Part (a) of FIG. 18 is a waveform chart showing the change in the voltage for the excitation of the power transmission coil 11, while Part (b) of FIG. 18 is a waveform chart showing the change in the voltage received by the subcoil SC1. At a time t0 shown in Part (a) of FIG. 18, the power transmission coil 11 is set to the first excitation. Specifically, the power transmission coil 11 is excited with an excitation pattern signal containing a pairing signal. As shown in Part (b) of FIG. 18, the subcoil SC1 receives the pairing signal at the time t0 and the intensity of the received signal rises further, so that pairing is performed at a time t1. Then, at a time t2, the power transmission coil 11 is switched from the first excitation to the second excitation. Since the vehicle 20 is moving relative to the parking space 32, the voltage received by the power reception coil 21 varies as shown in Part (b) of FIG. 18. When the received voltage then reaches the preset second threshold voltage Vth2, the vehicle 20 is determined to have reached the chargeable position.

In this embodiment, the description has been given of the example where whether or not the vehicle 20 has been stopped at the chargeable position is determined based on the level of the voltage received by the subcoil SC1. Note, however, that the present invention is not limited to this example. Whether or not the vehicle 20 has been stopped at the chargeable position can also be determined based on the level of the voltage received by the power reception coil 21.

Next, a detailed procedure of the pairing process, shown in Step a22 in FIG. 10, will be described with reference to a flowchart shown in FIG. 12.

Firstly, in Step S31, if any of the subcoils SC1 to SC4 is receiving a pairing signal, the vehicle controller 24 acquires the identification data from the pairing signal. Here, if two or more subcoils are receiving pairing signals, the vehicle controller 24 acquires combined data in which the pieces of identification data contained the pairing signals received by the subcoils are combined with each other.

Figure 19:
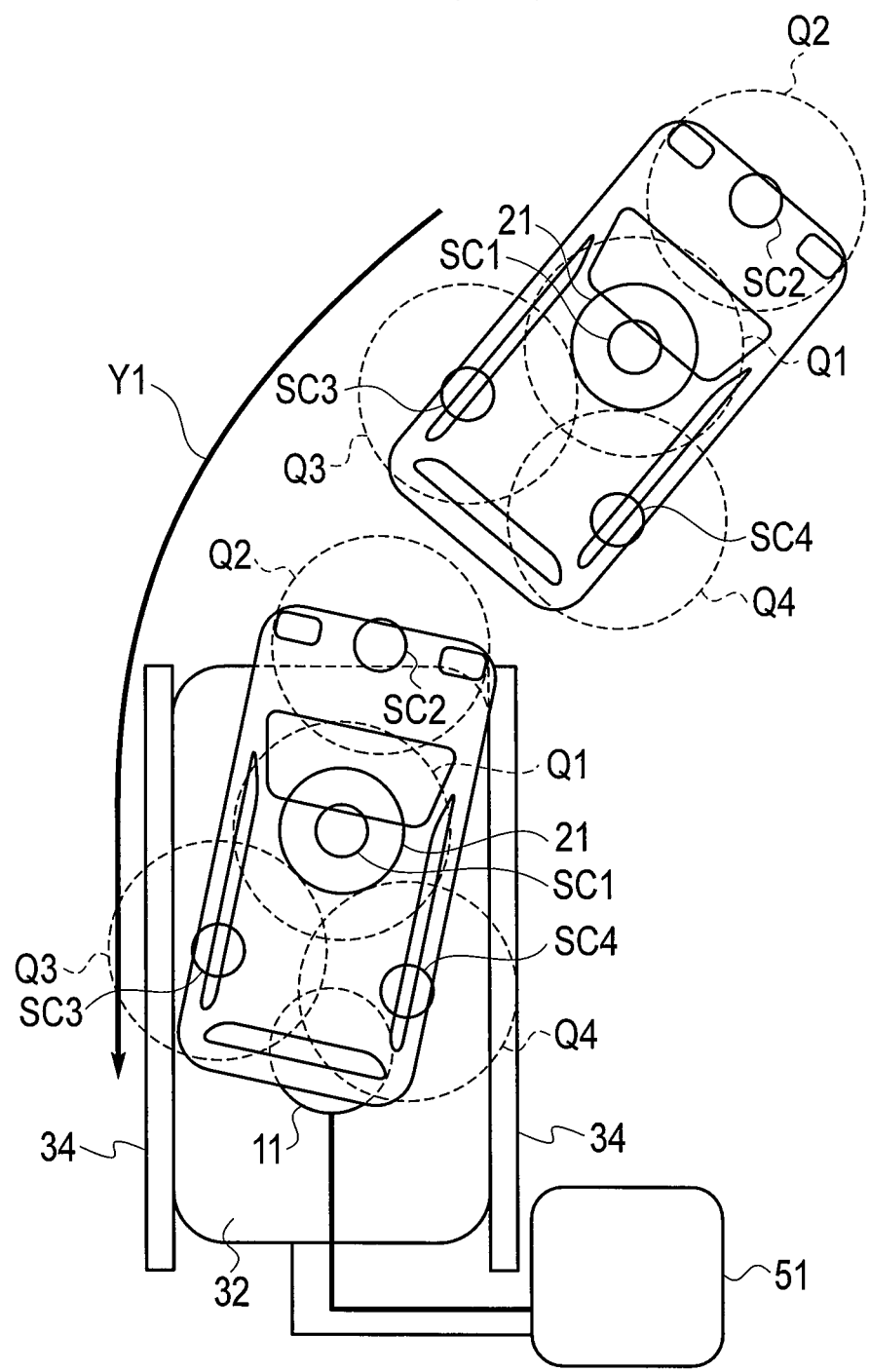
FIG. 19 is an explanatory diagram according to the embodiment of the present invention showing a state where two adjacent ones of the subcoils are receiving a pairing signal.

A method of generating the combined data will be described below with reference to an explanatory diagram shown in FIG. 19 and waveform charts shown in FIG. 20 and FIG. 21. FIG. 19 is an explanatory diagram showing a positional relation in a state where the vehicle 20 is entering the parking space 32. FIG. 20 is a set of waveform charts showing signals received by the two subcoils SC4, SC1. As shown in FIG. 19, as the vehicle 20 enters the parking space 32 by moving backward as indicated by arrow Y1 in the figure, the signal receivable range Q4 of the subcoil SC4 firstly overlaps the excitation range of the power transmission coil 11. Accordingly, as shown in Part (a) of FIG. 20, the voltage received by the subcoil SC4 rises gradually and reaches the first threshold voltage Vth1—a voltage that allows communication—at a time t11. As the vehicle 20 further enters the parking space 32, the signal receivable range Q4 of the subcoil SC4 gradually moves away from the power transmission coil 11 and therefore the voltage received by the subcoil SC4 starts to drop.

On the other hand, the signal receivable range Q1 of the subcoil SC1, which is wound around the same core as the power reception coil 21 (the ferrite core 61 in FIG. 6), overlaps the excitation range of the power transmission coil 11 after the signal receivable range Q4. Hence, as shown Part (b) of FIG. 20, the received voltage reaches the first threshold voltage Vth1 at a time t12. Here, since the signal receivable ranges Q1, Q4 partially overlap each other, the voltage received by the subcoil SC1 reaches the first threshold voltage Vth1 at the time t12, which is before a time t13 at which the voltage received by the subcoil SC4 falls below the first threshold voltage Vth1. In this way, the communication with the power transmission coil 11 can be taken over from the subcoil SC4 to the subcoil SC1, and the communication can therefore be prevented from being disconnected in the middle.

This applies not only to the subcoils SC4, SC1. The subcoils SC1, SC2, the subcoils SC1, SC3, and the subcoils SC3, SC4, i.e. the subcoils adjacent to each other have their signal receivable ranges partially overlapping each other. Hence, it is possible to prevent the communication from being disconnected in the middle between the adjacent subcoils.

Meanwhile, as shown in Part (a) of FIG. 20, the subcoil SC4 can acquire identification data which varies between "0" and "1", in the time period in which its received voltage is above the first threshold voltage Vth1 (t11 to t13). Consequently, as shown in Part (a) of FIG. 21, the identification data is acquired in the time period from the time t11 to the time t13. On the other hand, as shown in Part (b) of FIG. 20, the voltage received by the subcoil SC1 reaches the threshold voltage Vth1 at the time t12, and the subcoil SC1 can therefore acquire the identification data at and after the time t12. Consequently, the identification data is acquired as shown in Part (b) of FIG. 21. The vehicle controller 24 combines both pieces of identification data to generate combined data. Specifically, the vehicle controller 24 generates the combined data by ORing the identification data acquired by the subcoil SC4 (the waveform in Part (a) of FIG. 21) and the identification data acquired by the subcoil SC1 (the waveform in Part (b) of FIG. 21). As a result, combined data shown in Part (c) of FIG. 21 is obtained.

Figure 22:
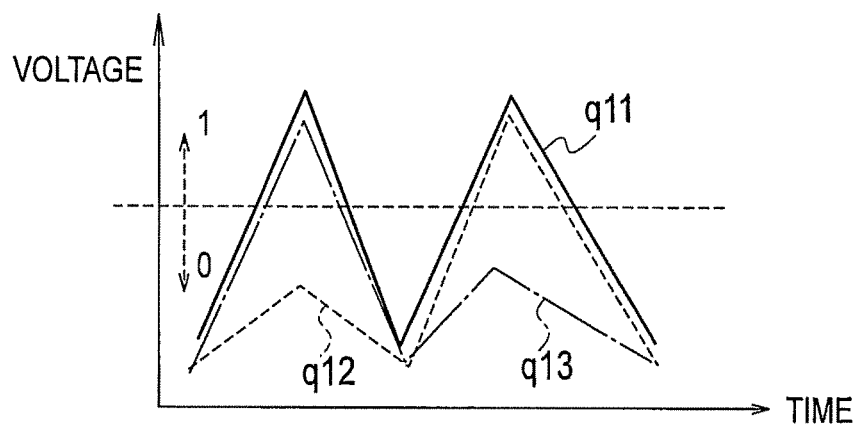
FIG. 22 is an explanatory diagram according to the embodiment of the present invention showing how received signals received by the two subcoils are combined.

In this embodiment, the description has been given of the example where the combined data is generated by ORing two pieces of identification data, as shown in Parts (a) to (c) of FIG. 21. Note, however, that combined data may be generated from a signal obtained by superimposing two pieces of identification data. For example, as shown in FIG. 22, in a case where the subcoil SC4 receives a signal indicated by a curve q13 and the subcoil SC1 receives a signal indicated by a curve q12, a signal q11 obtained by combining these received signals q12, q13 can be combined data. Specifically, by finding the larger of the received signals q12, q13, it is possible to acquire combined data similar to that acquired by ORing.

Figure 12:
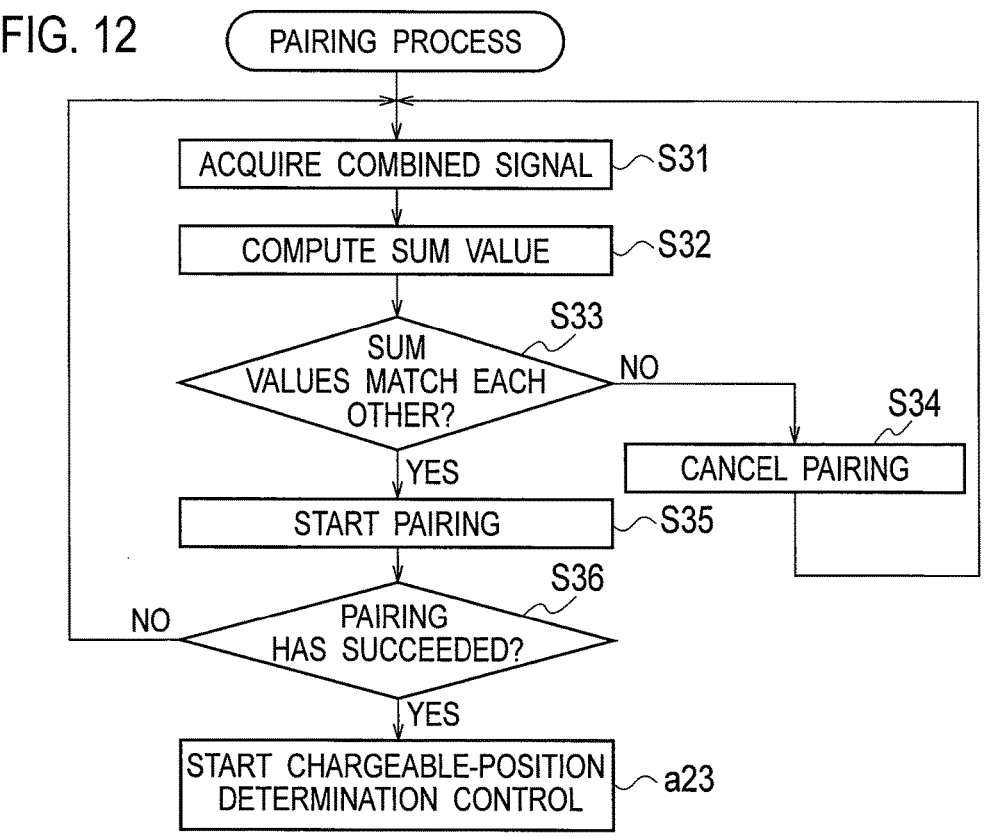
FIG. 12 is a flowchart showing the procedure of a pairing process by the wireless power supply system according to the embodiment of the present invention.

In Step S32, shown in FIG. 12, the vehicle controller 24 computes the sum value of the combined data. Then in Step S33, it is determined whether or not the sum value obtained in Step S32 matches the sum value of the identification data transmitted from the power transmission coil 11. If the sum values do not match each other (NO in Step S33), no pairing is performed. If pairing has already been done, this pairing is canceled in Step S34. Then, the process is brought back to Step S31.

On the other hand, if the sum values match each other (YES in Step S33), the vehicle controller 24 starts pairing in Step S35. In this processing, the data string of the combined data and the data string of the identification data transmitted from the power transmission coil 11 are compared with each other, and the power reception device 102 of the vehicle 20 and the power transmission device 101 are paired with each other if the two data strings match each other. Specifically, if for example the data string of the combined data is "1, 0, 1, 0" and the data string of the identification data transmitted from the power transmission coil 11 is "1, 0, 1, 0", the two data strings match each other and the power reception device 102 and the power transmission device 101 are therefore paired with each other.

In Step S36, the vehicle controller 24 determines whether or not the pairing has succeeded. If the pairing has not succeeded (NO in Step S36), the process is brought back to Step S31. If the pairing has succeeded (YES in Step S36), the chargeable-position determination control is started in Step a23.

Next, detailed description will be given of a case where the combined data acquired by the vehicle controller 24 and the identification data transmitted from the ground controller 13 match each other and a case the where they do not match each other. If the vehicle 20 properly enters the parking space 32 between the parking lines 34 as shown in FIG. 19, the identification data acquired by each of the subcoils SC1 to SC4 is the same as the identification data transmitted from the power transmission coil 11.

Then, if combined data is generated by ORing the pieces of identification data acquired by the subcoils SC1 to SC4, this combined data matches the identification data transmitted from the ground controller 13. Specifically, as described with reference to Parts (a) to (c) of FIG. 21, if combined data is generated by combining the identification data received by the subcoil SC4 and the identification data received by the subcoil SC1, this combined data matches the identification data transmitted from the power transmission coil 11. Thus, in the processing of Step S33 in FIG. 12, the sum value of the combined data is determined to match the other, and therefore pairing is performed using this combined data.

If the pieces of identification data acquired by the subcoils SC1 to SC4 do not match each other, the identification data transmitted from the power transmission coil 11 and the combined data of the pieces of identification data received by the subcoils SC1 to SC4 do not match each other, which means an error. This will be described below with reference to an explanatory diagram shown in FIG. 23 and waveform charts shown in FIG. 24.

Figure 23:
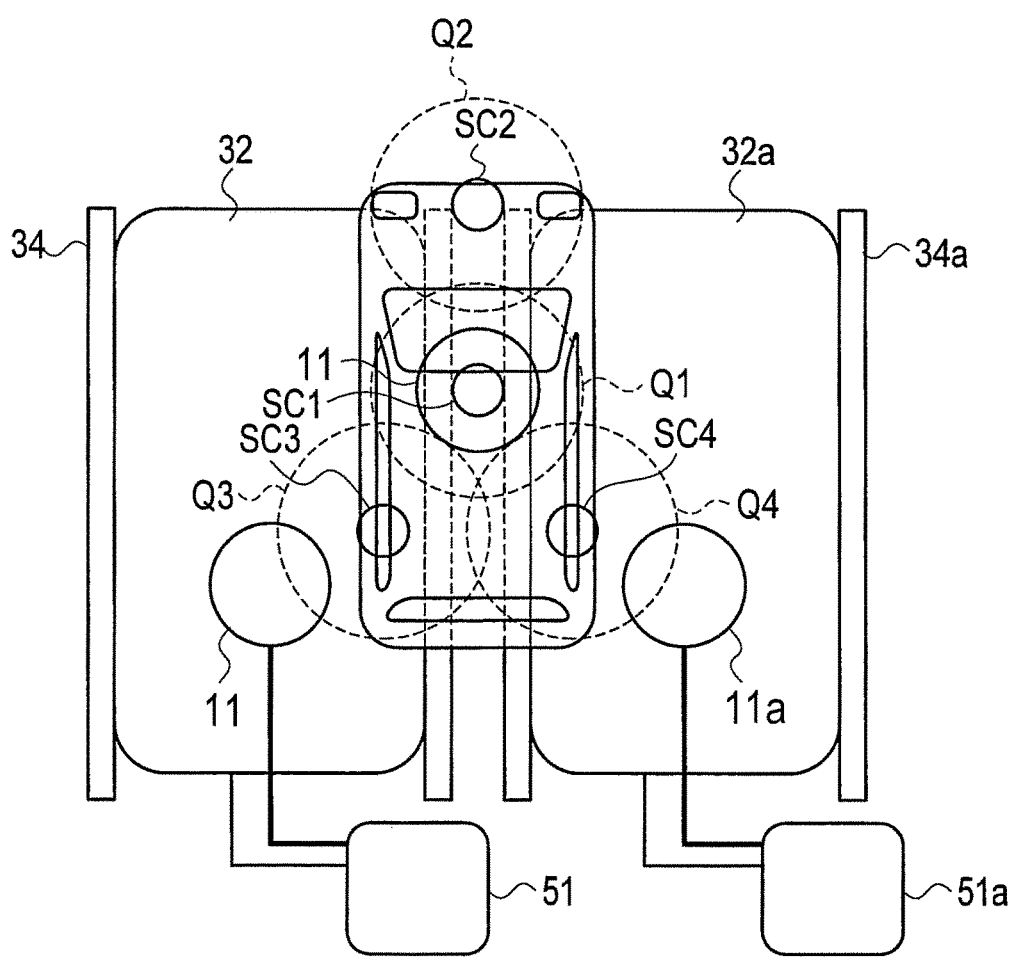
FIG. 23 is an explanatory diagram according to the embodiment of the present invention showing a state where the vehicle has entered the two parking spaces in such a way as to straddle them.

Consider a case where the vehicle 20 enters the two parking spaces 32, 32a in such a way as to straddle them, as shown in FIG. 23. In this case, the subcoil SC3 receives a pairing signal transmitted from the power transmission coil 11 in the parking space 32, whereas the subcoil SC4 receives a pairing signal transmitted from the power transmission coil 11a in the parking space 32a. Consequently, the identification data acquired by the subcoil SC3 appears as the waveform shown in Part (a) of FIG. 24, whereas the identification data acquired by the subcoil SC4 appears as the waveform shown in Part (b) of FIG. 24.

Since the two waveforms are different from each other, combined data generated by ORing them has an invalid waveform, as shown in Part (c) of FIG. 24. Hence, in the processing in Step S33 in FIG. 12, the sum values are determined not to match each other, and the pairing is canceled.

In sum, if the vehicle 20 enters the two parking spaces 32, 32a in such a way as to straddle them, as shown in FIG. 23, pairing is performed with neither of the parking spaces 32, 32a. Thus, the driver of the vehicle 20 moves the vehicle 20 and performs operation of entering the desired parking space.

FIG. 23 has shown the example where the pairing is canceled if the pieces of identification data acquired by the subcoil SC3 and the subcoil SC4, provided on the rear side relative to the power reception coil 21, are different from each other. Note, however, that the pairing is also canceled if the identification data is different between the subcoil SC2, provided on the front side relative to the power reception coil 21, and the subcoil SC3 or SC4, provided on the rear side. That is, the wireless power supply system according to this embodiment cancels the pairing if the identification data received by the subcoil provided on the front side relative to the power reception coil 21 and the identification data received by either of the subcoils provided on the rear side relative to the power reception coil 21 are different from each other.

Further, the plurality of pieces of identification data may not be combined; the pieces of identification data acquired by the subcoils SC1 to SC4 may be compared with each other, and the pairing may be canceled if at least one of the pieces of identification data is different from the other pieces of identification data.

Figure 25:
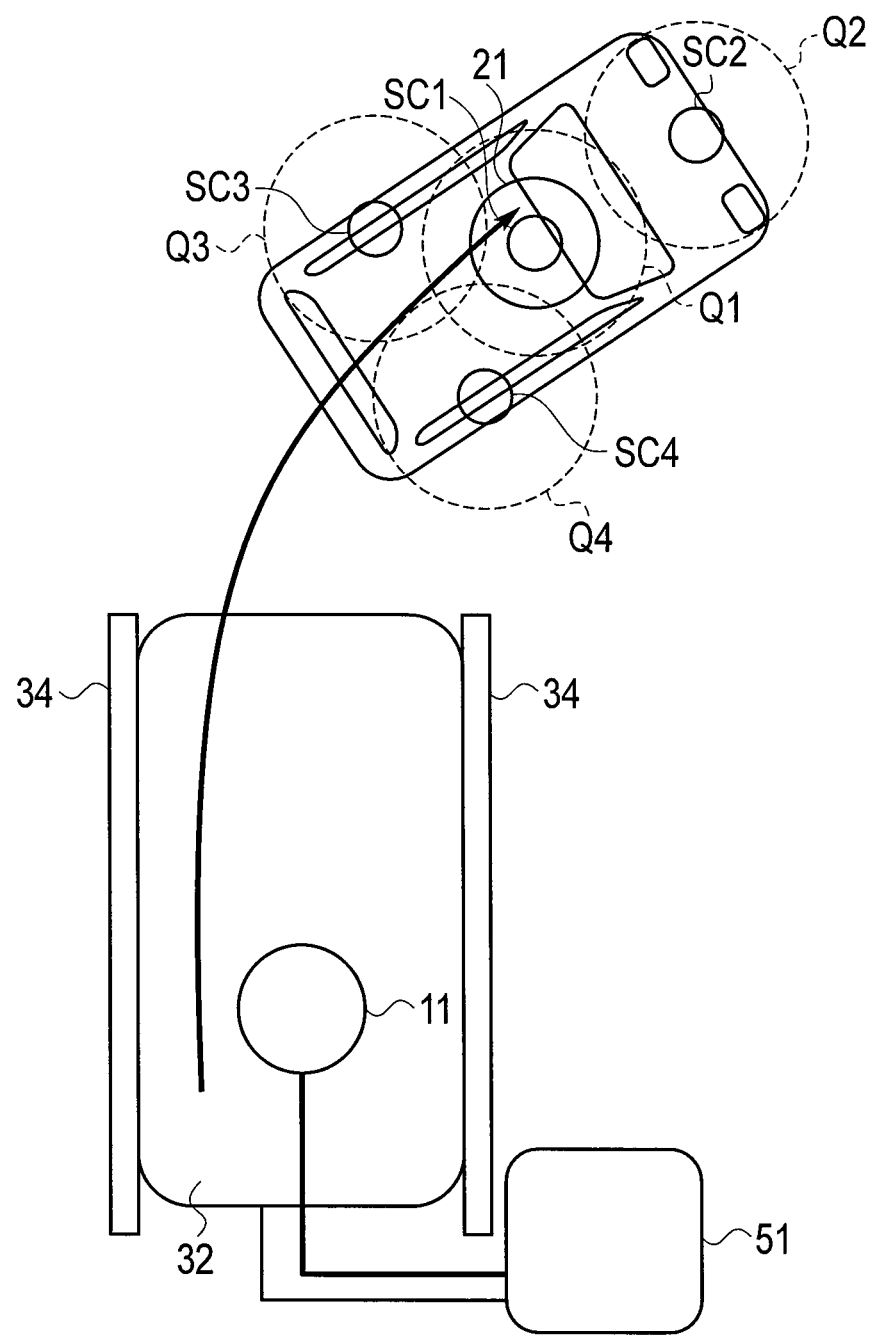
FIG. 25 is an explanatory diagram according to the embodiment of the present invention showing a state where the vehicle has departed from one of the parking spaces.

Next, description will be given of operation in a situation where pairing is performed between the power reception device 102 and the power transmission device 101 but the vehicle 20 then departs from the parking space 32, with reference to a flowchart shown in FIG. 13 and an explanatory diagram shown in FIG. 25. This operation is performed in a situation where pairing is completed between the vehicle 20 and the parking space 32 but the vehicle 20 then departs from the parking space 32 without charging the battery 23, and in other similar situations.

Figure 13:
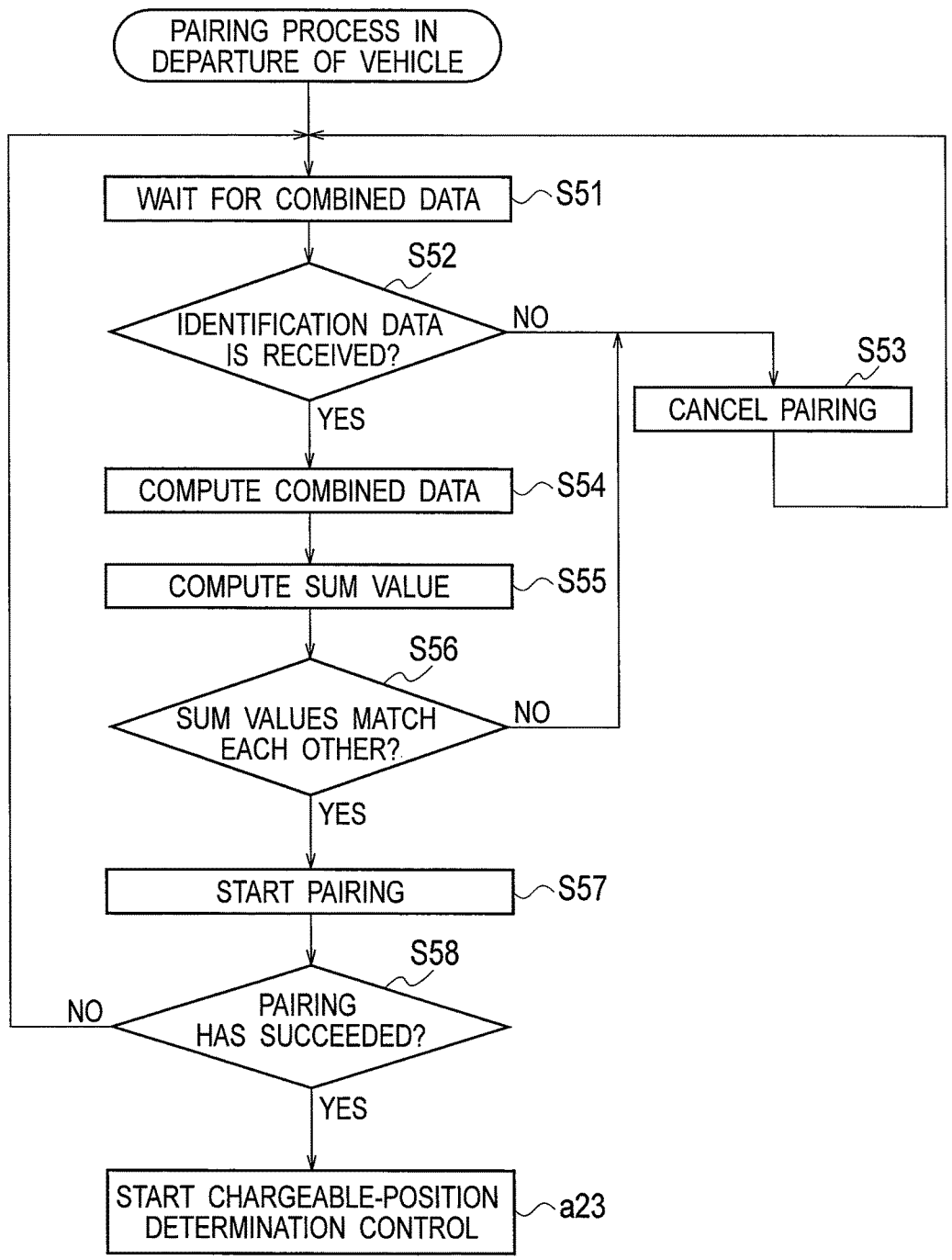
FIG. 13 is a flowchart showing the procedure of a pairing process in departure of the vehicle by the wireless power supply system according to the embodiment of the present invention.

First, in Step S51 in FIG. 13, the vehicle controller 24 waits for combined data. In Step S52, the vehicle controller 24 determines whether or not the subcoils SC1 to SC4 have received pairing signals and acquired pieces of identification data. If no identification data is acquired for a certain period of time (NO in Step S52), the pairing is canceled in Step S53. Then, the process is brought back to Step S51.

On the other hand, if pieces of identification data are acquired (YES in Step S52), the vehicle controller 24 generates combined data in Step S54 by ORing the pieces of identification data acquired by the subcoils.

In Step S55, the vehicle controller 24 computes the sum value of the combined data thus generated. Further in Step S56, it is determined whether or not the sum value matches the sum value of the identification data contained in the pairing signal transmitted from the ground controller 13.

Then, if the sum values do not match each other (NO in Step S56), the pairing is canceled in Step S53. On the other hand, if the sum values match each other (YES in Step S56), the vehicle controller 24 starts the pairing in Step S57. In Step S58, the vehicle controller 24 determines whether or not the pairing has succeeded. If the pairing has succeeded, the chargeable-position determination control is started in Step a23 (see FIG. 10).

As described above, if the vehicle 20 departs from the parking space 32, the pairing is cancelled as soon as the communication between the subcoils SC1 to SC4 and the power transmission coil 11 is disconnected.

As described above, in the wireless power supply system according to this embodiment, the plurality of subcoils SC1 to SC4 are mounted at the bottom of the vehicle 20. Further, as the vehicle 20 approaches the parking space 32, the power transmission coil 11 is set to the first excitation and transmits a pairing signal. Furthermore, when at least one of the subcoils SC1 to SC4 receives this pairing signal, it is determined whether the identification data contained in this pairing signal and the identification data contained in the pairing signal transmitted from the power transmission coil 11 match each other. If they match each other, the power reception device 102, mounted on this vehicle 20, and the power transmission device 101 are paired with each other.

In this way, the vehicle 20 and the parking space 32 can be paired with each other before the vehicle 20 is stopped at the predetermined position in the parking space 32. Hence, it is possible to quickly perform the chargeable-position determination control and the wireless charging, which are executed after the pairing.

Also, at least one subcoil is mounted on each of the front side and the rear side relative to the power reception coil 21. Specifically, the subcoil SC2 is mounted on the front side relative to the power reception coil 21, and the subcoils SC3, SC4 are mounted on the rear side relative to the power reception coil 21. In this way, the identification data transmitted from the power transmission coil 11 can be received by any of the subcoils in both of the case where the vehicle 20 approaches the parking space 32 by moving forward and the case where the vehicle 20 approaches the parking space 32 by moving backward.

Further, two or more subcoils are provided on at least one of the front side and the rear side relative to the power reception coil 21. Specifically, the two subcoils SC3, SC4 are provided on the rear side relative to the power reception coil 21. In this way, once pairing is established, it is possible to continue receiving the pairing signal until the vehicle 20 then moves and reaches the predetermined position in the parking space 32.

Also, the signal receivable ranges of the subcoils adjacent to each other overlap each other partially. In this way, it is possible to prevent the communication with the power transmission coil 11 from being disconnected.

Also, if the sum values of the pieces of identification data received by the subcoils or the sum value of the combined data thereof and the sum value of the identification data transmitted from the power transmission coil do not match each other, no identification data is transmitted. Specifically, the vehicle controller 24 determines the soundness of the combined identification data, and does not transmit the combined identification data to the ground unit 51 if it is not sound. In this way, when, for example, pieces of identification data transmitted from a plurality of parking spaces are present together, it is possible to avoid pairing and have the driver recognize that the parked position of the vehicle 20 is inappropriate.

Further, the pairing is canceled if the pairing signals received by all the subcoils SC1 to SC4 are interrupted or if the identification data contained in the pairing signals becomes mismatched with the identification data contained in the pairing signal transmitted from the ground unit 51. Thus, if the vehicle 20 departs from the parking space 32, the pairing is canceled as soon as the communication between the subcoils SC1 to SC4 and the power transmission coil 11 is disconnected. In this way, the vehicle 20 can instantly shift to pairing operation with a different parking space. Moreover, the parking space 32 after the cancellation of the pairing can shift to pairing with a different vehicle.

Description of Modifications of this Embodiment

In the above-described embodiment, the description has been given of the example where the subcoils SC1 to SC4 shown in FIG. 4 are mounted as the subcoils provided at the bottom of the vehicle 20. Specifically, the description has been given of the example where mounted are the subcoil SC1 wound around the same core as the power reception coil 21, the subcoil SC2 provided on the front side relative to the subcoil SC1, and the subcoils SC3, SC4 provided on the left rear side and the right rear side relative to the subcoil SC1, respectively.

The present invention only requires at least one subcoil to be mounted on each of the front side and the rear side relative to the power reception coil 21. Besides the subcoil arrangement shown in FIG. 4, arrangements shown in Parts (a) to (d) of FIG. 26 may be employed, for example. Part (a) of FIG. 26 includes a subcoil SC2 provided on the front side relative to the power reception coil 21 and a subcoil SC5 provided on the rear side relative to the power reception coil 21. Also, no subcoil is mounted near the power reception coil 21. In other words, the subcoil SC1 shown in FIG. 4 is not mounted. A signal receivable range Q0 is set around the power reception coil 21, a signal receivable range Q2 is set around the subcoil SC2, and a signal receivable range Q5 is set around the subcoil SC5.

In this case, the power reception coil 21 receives a pairing signal transmitted from the power transmission coil 11 and acquires the identification data. Specifically, when the signal receivable range Q0 of the power reception coil 21 overlaps the excitation range of the power transmission coil 11, the power reception coil 21 receives a pairing signal transmitted from the power transmission coil 11. Then, the identification data contained in the pairing signal received by the power reception coil 21 is acquired, and pairing is performed. This subcoil arrangement can also achieve advantageous effects similar to those by the above-described embodiment. Also, since the power reception coil 21 is used to acquire the identification data, the number of subcoils can be reduced.

Part (b) of FIG. 26 includes a subcoil SC1 wound around the same core as the power reception coil 21, a subcoil SC2 provided on the front side relative to the power reception coil 21, and a subcoil SC5 provided on the rear side relative to the power reception coil 21. Moreover, a signal receivable range Q1 is set around the subcoil SC1, a signal receivable range Q2 is set around the subcoil SC2, and a signal receivable range Q5 is set around the subcoil SC5. This subcoil arrangement can also achieve advantageous effects similar to those by the above-described embodiment.

Part (c) of FIG. 26 includes a subcoil SC2 provided on the front side relative to the power reception coil 21, subcoils SC3, SC4 provided on the left rear side and the right rear side relative to the power reception coil 21, respectively, and a subcoil SC6 provided rearward of the subcoils SC3, SC4. Moreover, a signal receivable range Q0 is set around the power reception coil 21, a signal receivable range Q2 is set around the subcoil SC2, a signal receivable range Q3 is set around the subcoil SC3, a signal receivable range Q4 is set around the subcoil SC4, and a signal receivable range Q6 is set around the subcoil SC6. This subcoil arrangement can also achieve advantageous effects similar to those by the above-described embodiment.

Part (d) of FIG. 26 includes a subcoil SC2 provided on the front side relative to the power reception coil 21 and subcoils SC3, SC4 provided on the left rear side and the right rear side relative to the power reception coil 21, respectively. Moreover, a signal receivable range Q0 is set around the power reception coil 21, a signal receivable range Q2 is set around the subcoil SC2, a signal receivable range Q3 is set around the subcoil SC3, and a signal receivable range Q4 is set around the subcoil SC4. This subcoil arrangement can also achieve advantageous effects similar to those by the above-described embodiment.

Although the wireless power supply system and the wireless power reception device of the present invention have been described based on the illustrated embodiment, the present invention is not limited to those. The configuration of each part can be replaced with any configuration having a similar function.

For example, in the above-described embodiment, the description has been given of the example where the battery 23 is the electric load. However, the present invention is not limited to this example. For instance, an electric motor can be the electric load.

REFERENCE SIGNS LIST 11, 11a power transmission coil
12 power unit
13 ground controller
14 communication unit
15 dc power source
20 vehicle
21 power reception coil
22 rectification-smoothing circuit
23 battery
24 vehicle controller
25 communication unit
31 inverter circuit
32, 32a parking space
33, 33a vehicle detection sensor
51, 51a ground unit
61 ferrite core
101 power transmission device
102 power reception device

The invention claimed is:

1. A wireless power supply system comprising:
a power transmission device provided on the ground and configured to transmit power; and
a power reception device provided to a vehicle and configured to receive power transmitted from the power transmission device and supply the power to an electric load, wherein
the power transmission device includes
a power transmission coil provided at a parking space and configured to transmit power,
a ground controller configured to control power to be supplied to the power transmission coil, and
a power-transmission-side wireless device configured to communicate with the power reception device,
the power reception device includes
a power reception coil configured to receive power transmitted from the power transmission coil and supply the received power to the vehicle as drive force,
at least one subcoil provided on each of a front side and a rear side of the vehicle relative to the power reception coil and configured to receive, as an excitation pattern signal, power transmitted from the power transmission coil,
a vehicle controller configured to control power reception of the power reception coil and the subcoils, and
a power-reception-side wireless device configured to communicate with the power transmission device,
when the vehicle approaches the parking space, the ground controller performs excitation using an excitation pattern signal containing identification data,
the vehicle controller acquires the identification data from the excitation pattern signal received by at least one of the subcoils, and the power-reception-side wireless device transmits the acquired identification data to the power transmission device,
the ground controller pairs the power transmission coil and the power reception coil with each other when the identification data contained in the excitation pattern signal and the identification data transmitted from the vehicle controller match each other, and
the pairing is canceled if the identification data received by the subcoil provided on the front side and the identification data received by the subcoil provided on the rear side are different from each other.

2. The wireless power supply system according to claim 1, wherein
two or more subcoils are provided on at least one of the front side of the vehicle and the rear side of the vehicle relative to the power reception coil, and
the vehicle controller generates combined data by combining the pieces of identification data detected by the two or more subcoils provided on the at least one side of the vehicle, and transmits the combined data to the power transmission device.

3. The wireless power supply system according to claim 2, wherein the vehicle controller determines soundness of the combined data, and does not transmit the combined data to the power transmission device if the combined data is not sound.

4. The wireless power supply system according to claim 2, wherein the two or more subcoils provided on the at least one side of the vehicle have signal receivable ranges which partially overlap each other and within which the excitation pattern signal is receivable.

5. The wireless power supply system according to claim 1, wherein after pairing the power transmission coil and the power reception coil with each other, the ground controller cancels the pairing if the identification data transmitted from the vehicle controller is interrupted or the identification data starts becomes mismatched.

\* \* \* \* \*